United States Patent
Oda et al.

(10) Patent No.: US 8,300,633 B2
(45) Date of Patent: Oct. 30, 2012

(54) NETWORK QUALITY MONITORING DEVICE AND METHOD FOR INTERNET SERVICES INVOLVING SIGNALING

(75) Inventors: Ryuji Oda, Fukuoka (JP); Junji Tagane, Fukuoka (JP); Kazunori Umezaki, Fukuoka (JP); Katsuyuki Fujiyoshi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 581 days.

(21) Appl. No.: 12/620,769

(22) Filed: Nov. 18, 2009

(65) Prior Publication Data
US 2010/0150014 A1 Jun. 17, 2010

(30) Foreign Application Priority Data
Dec. 15, 2008 (JP) .................................. 2008-319006

(51) Int. Cl.
*H04L 12/66* (2006.01)

(52) U.S. Cl. .................................................... 370/352
(58) Field of Classification Search .................. None
See application file for complete search history.

(56) References Cited

U.S. PATENT DOCUMENTS

| | | | |
|---|---|---|---|
| 2003/0235187 A1* | 12/2003 | Iwama et al. | 370/352 |
| 2005/0097387 A1 | 5/2005 | Ano et al. | |
| 2005/0249196 A1* | 11/2005 | Ansari et al. | 370/352 |
| 2007/0171925 A1* | 7/2007 | Tanimoto | 370/401 |
| 2007/0268896 A1* | 11/2007 | Oyama et al. | 370/389 |
| 2009/0059798 A1* | 3/2009 | Lee et al. | 370/241 |

FOREIGN PATENT DOCUMENTS
JP 2005-102180 4/2005

* cited by examiner

*Primary Examiner* — Raj Jain
(74) *Attorney, Agent, or Firm* — Katten Muchin Rosenman LLP

(57) ABSTRACT

A network quality monitoring device includes a packet receiving unit that receives packets used by a signaling protocol server device that is a server device for processing the signaling protocol, a signaling protocol packet extracting unit that extracts signaling protocol packets for controlling the signaling protocol from packets received by the packet receiving unit, a session management table storing unit that stores the session management tables, a signaling protocol quality analyzing unit that collects quality information regarding the network quality from a session management table corresponding to sessions that have transitioned to a predetermined communication state among the session management tables stored in the session management table storing unit and, based on the collection result, analyzes statistical information regarding the network quality.

12 Claims, 35 Drawing Sheets

FIG. 3

■SIP REQUEST

301 SIP HEADER

INVITE sip:05022222222@192.168.2.55;user=phone SIP/2.0

Via:SIP/2.0/UDP 192.168.2.55;6060;branch=z9hG4bK40c04cdc000e29fe.1

Via:SIP/2.0/UDP 192.168.1.10;5060;branch=z9hG4bK213caef0394256

CALLER INFORMATION — From:" UserA" <sip:05011111111@192.168.2.55;user=phone>;tag=t1234aa CALLEE INFORMATION — To:" UserB" <sip:05022222222@192.168.2.55;user=phone>

SESSION IDENTIFICATION INFORMATION — Call-ID:05011111111-1143760921-1@192.168.1.10

METHOD NAME IDENTIFICATION INFORMATION — CSeq:1 INVITE

Record-Route:<sip:192.168.2.55;6060;lr>
Contact:<sip:05011111111@192.168.1.10;5060>
Supported:timer
Session-Expires:3600
Min-SE:180
Expires:600
In-Reply-To:05011111111@192.168.1.10
Date:The, 30 Mar 2006 23:22:01 GMT
Max-Forwards:70
Content-Type:application/sdp
Content-Length:180

302 BODY TEXT v=0
o=UserA 100 100 IN IP4 192.168.1.10
s=-
c=IN IP4 192.168.1.10
t=0 0
m=audio 49152 RTP/AVP 0 8 18
a=rtpmap:0 pcmu/8000/1
a=rtpmap:8 pcma/8000/1
a=rtpmap:18 G729/8000/1

*FIG. 4*

■SIP RESPONSE

| | | |
|---|---|---|
| 401 SIP HEADER | FACTOR DETERMINATION INFORMATION | SIP/2.0 200 OK<br>Via:SIP/2.0/UDP<br>192.168.2.55;6060;branch<br>=z9hG4bK40c04cdc000e29fe.1<br>Via:SIP/2.0/UDP<br>192.168.1.10;5060;branch<br>=z9hG4bK213caef0394256<br>Record-Route:<sip:192.168.2.55;6060;lr> |
| | CALLER INFORMATION | From:" UserA"<br><sip:05011111111@192.168.2.55;user<br>=phone>;tag=t1234aa |
| | CALLEE INFORMATION | To:" UserB" |
| | SESSION IDENTIFICATION INFORMATION | <sip:05022222222@192.168.2.55;<br>user=phone>;tag=6d3c5ee7<br>Call-ID:05011111111-1143760921-1 |
| | METHOD NAME IDENTIFICATION INFORMATION | @192.168.1.10<br>CSeq:1 INVITE |
| 402 BODY TEXT | | Contact:<sip:05022222222@apg52-m1,<br>fujitsu.com;5060;transport=udp><br>Content-Length:183<br>Content-Type:application/sdp<br>Allow:INVITE,ACK,OPTIONS,BYE,CANCEL,INFO<br>Supported:timer<br>Require:timer<br>Session-Expires:3600;refresher=uas<br><br>v=0<br>o=UserB1 200 200 IN IP4 192.168.2.10<br>s=call<br>c=IN IP4 192.168.2.10<br>t=0 0<br>m=audio 9999 RTP/AVP 0 8 18<br>a=rtpmap:0 pcmu/8000/1<br>a=rtpmap:8 pcma/8000/1<br>a=rtpmap:18 G729/8000/1 |

FIG. 5

| SESSION MANAGEMENT COMPLETION FLAG | |
|---|---|
| SIP HEADER INFORMATION | |
| Call-ID | |
| From(SIP-URI) | |
| To(SIP-URI) | |

| EGRESS INFORMATION | INGRESS INFORMATION |
|---|---|
| DESTINATION IP ADDRESS | DESTINATION IP ADDRESS |
| SOURCE IP ADDRESS | SOURCE IP ADDRESS |
| SESSION STATE | SESSION STATE |
| FINAL RESPONSE CODE | FINAL RESPONSE CODE |
| COMPLETION/ NONCOMPLETION DISPLAY | COMPLETION/ NONCOMPLETION DISPLAY |
| INVITE RECEPTION TIME | INVITE RECEPTION TIME |
| 18x RECEPTION TIME | 18x RECEPTION TIME |
| 23456xx RECEPTION TIME | 23456xx RECEPTION TIME |
| CANCEL RECEPTION TIME | CANCEL RECEPTION TIME |

RECORD OF 1 SESSION

FIG. 8A
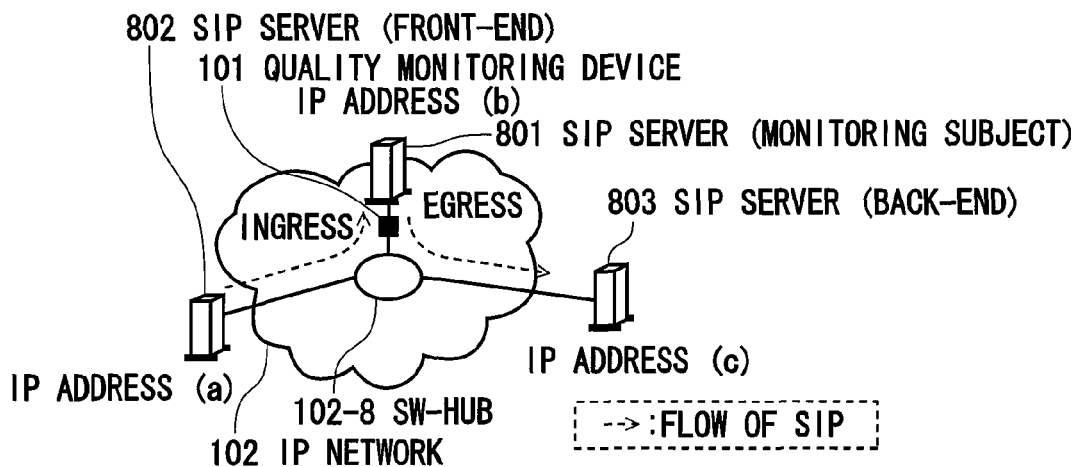
FIG. 8B
REQUEST FROM CALLER TO CALLEE
RESPONSE FROM CALLEE TO CALLER
REQUEST FROM CALLEE TO CALLER
RESPONSE FROM CALLER TO CALLEE

FIG. 29A

| |
|---|
| SYSTEM TIME AND DATE |
| Call ID |
| STATISTICAL OUTPUT TIME |
| INVITE PROCESSING TIME |
| INGRESS CONNECTION TIME (RINGING TIME) |
| EGRESS CONNECTION TIME (RINGING TIME) |
| From TELEPHONE NUMBER |
| To TELEPHONE NUMBER |
| Src IP Addr |
| Dst IP Addr |

FIG. 29B

| | |
|---|---|
| THREE-PART DATA | INVITE PROCESSING TIME (INTEGRATED) |
| | NUMBER OF PROCESSED INVITE CALLS |
| | INVITE PROCESSING TIME (AVERAGE) |
| | INGRESS RINGING TIME (INTEGRATED) |
| | NUMBER OF INGRESS RINGING CALLS |
| | INGRESS RINGING TIME (AVERAGE) |
| | EGRESS RINGING TIME (INTEGRATED) |
| | NUMBER OF EGRESS RINGING CALLS |
| | EGRESS RINGING TIME (AVERAGE) |

FIG. 32A

| THREE-PART DATA | ALL CALLS | TOTAL NUMBER OF CALLS |
| | | NUMBER OF ABNORMAL CALLS |
| | | NUMBER OF INCOMPLETE CALLS |
| | | NUMBER OF NONCOMPLETION OCCURRENCE CALLS |
| | INGRESS | TOTAL NUMBER OF CALLS |
| | | NUMBER OF ABNORMAL CALLS |
| | | NUMBER OF INCOMPLETE CALLS |
| | | NUMBER OF NONCOMPLETION OCCURRENCE CALLS |
| | EGRESS | TOTAL NUMBER OF CALLS |
| | | NUMBER OF ABNORMAL CALLS |
| | | NUMBER OF INCOMPLETE CALLS |

FIG. 32B

| COMPLETION TIME |
| --- |
| Call ID |
| INGRESS COMPLETION FLAG: COMPLETION (1)/NONCOMPLETION (0) |
| EGRESS COMPLETION FLAG: COMPLETION (1)/NONCOMPLETION (0) |
| NONCOMPLETION OCCURRENCE FLAG |
| ALL CALLS RESPONSE CODE |
| INGRESS RESPONSE CODE |
| EGRESS RESPONSE CODE |
| CALLER INFORMATION |
| CALLEE INFORMATION |
| SOURCE IP ADDRESS |
| DESTINATION IP ADDRESS |

NETWORK QUALITY MONITORING DEVICE AND METHOD FOR INTERNET SERVICES INVOLVING SIGNALING

CROSS-REFERENCE TO RELATED APPLICATIONS

This application is based upon and claims the benefit of priority of the prior Japanese Patent Application No. 2008-319006, filed on Dec. 15, 2008, the entire contents of which are incorporated herein by reference.

FIELD

The technique disclosed herein is related to a technique for monitoring network quality in Internet services such as IP telephony which are controlled by a signaling protocol. Such quality monitoring can be utilized for, for example, identifying an affected range (area codes or users) of a failure or a congestion occurring at a signaling server, a router, or the like.

BACKGROUND

Services that perform peer-to-peer communication on the Internet require a technique for transmitting, in real-time, media information such as audio, video, text, and the like using IP (Internet protocol) packets. In addition, a signaling technique for controlling establishment, modification, and disconnection (termination) of a peer-to-peer session (call) on the Internet is essential. Peer-to-peer communication services include IP telephony, videotelephony, instant messaging, and the like.

In particular, IP telephony, whose popularity has increased dramatically in recent years, is realized as a combination of a VoIP (Voice Over IP) technique that enables real-time transmission of audio signals in IP packets, and a signaling technique.

As a signaling protocol usable in IP telephony, the H.323 standard recommended by the ITU-T (International Telecommunication Union-Telecommunication sector) in 1997 has been realized. In addition, SIP (Session Initiation Protocol) that was specified as a standards track in RFC 3261 standardized by the IETF (Internet Engineering Task Force) and issued in 2002 has been realized. In particular, in SIP, messages are described in text. Furthermore, SIP is designed based on HTTP (Hyper Text Transfer Protocol) for the Web and on SMTP (Simple Message Transfer Protocol) for e-mails. Consequently, SIP is simple, highly scalable, and has high affinity with the Internet. As a result, SIP is becoming the standard of signaling protocols used in IP telephony.

SIP is a signaling protocol for controlling establishment, modification, and disconnection (termination) of a session (call) between terminals on an application layer.

A method (SIP request message) and a response (SIP response message) are exchanged according to a predetermined procedure between terminals via a relay server called an SIP server which is disposed on the Internet. Accordingly, the establishment, modification, and disconnection (termination) of a session are controlled.

For example, establishing a session begins with a transmission of an INVITE message. In SIP, a terminal (UA: User Agent) is identified using a URI (Uniform Resource Identifier) format such as sip:hanako@fujitsu.com and sip:taro@fujitsu.com.

The exchange of an SIP message involves notifying what is used as a medium (audio, video, text). For example, in the case of an audio medium, an encoding scheme used, a protocol for carrying audio packets, a port number to be used, an audio packet transmitting frequency, and the like are notified.

In telephone services overall, responding to occurrences of network failure and promptly restoring service thereafter are essential for securing customer satisfaction and service credibility. When a failure occurs, swiftly comprehending network quality and an affected range (affected users) is required in order to appropriately respond to envisioned customer inquiries, to prevent the effect from spreading, and to restore service.

A conventional public switched telephone network (PSTN) uses a scheme in which communication paths are secured on a single line-basis, and a detection of a communication error, a congestion, or the like leads to the blockage of an entire communication path. Therefore, line quality and an affected range can be identified by verifying the blockage state of the communication path.

IP telephony is a new form of telephone service and is fundamentally a service in accordance with the IP protocol. Therefore, a technique that identifies network quality and a failure range based on the concept of a communication path, as is the case in PSTN, cannot be applied.

Conventionally, quality monitoring and failure detection in an IP telephone service depends on the quality of the IP network thereof and on a failure detecting method used in the IP network.

For example, Japanese Patent Laid-Open No. 2005-102180 discloses that a path combination in which a failure has occurred can be identified by measuring communication quality information on all path combinations that make up the Internet between terminals.

SUMMARY

According to an aspect of the invention, a network quality monitoring device operated on an IP network in which communication is performed based on an Internet protocol and monitoring network quality in an Internet service whose communication state is controlled based on a signaling protocol, the network quality monitoring device includes a packet receiving unit that receives packets used by a signaling protocol server device that is a server device for processing the signaling protocol and which receives a request from a client to communicate with the IP network, a signaling protocol packet extracting unit that extracts signaling protocol packets for controlling the signaling protocol from packets received by the packet receiving unit, a signaling protocol packet analyzing unit that analyzes signaling protocol packets for establishing the communication session which are extracted by the signaling protocol packet extracting unit and which are transmitted and received by the signaling protocol server device respectively at an ingress and an egress in order to associate signaling protocol information obtained from the signaling protocol packets and the session states for each session and for each ingress and egress and manage the associated signaling protocol information and the session states as session management tables while managing transitions of the session states, a session management table storing unit that stores the session management tables, a signaling protocol quality analyzing unit that collects quality information regarding the network quality from a session management table corresponding to sessions that have transitioned to a predetermined communication state among the session management tables stored in the session management table storing unit and, based on the collection result, analyzes statistical information regarding the network quality, and a statistical information notifying unit that notifies the quality information and the statistical information obtained at the signaling protocol quality analyzing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a data configuration example of an SIP message (SIP request);

FIG. 4 is a diagram illustrating a data configuration example of an SIP message (SIP response);

FIG. 5 is a data configuration diagram illustrating information stored in a session management table;

FIGS. 8A and 8B are operational illustrative diagrams of a general SIP proxy;

FIGS. 29A and 29B are diagrams illustrating data configuration examples of a connection time table and a processing time statistical information table, respectively;

FIGS. 32A and 32B are diagrams illustrating data configuration examples of a statistical information table and a noncompletion occurrence table, respectively.

DESCRIPTION OF EMBODIMENTS

Figure 1:
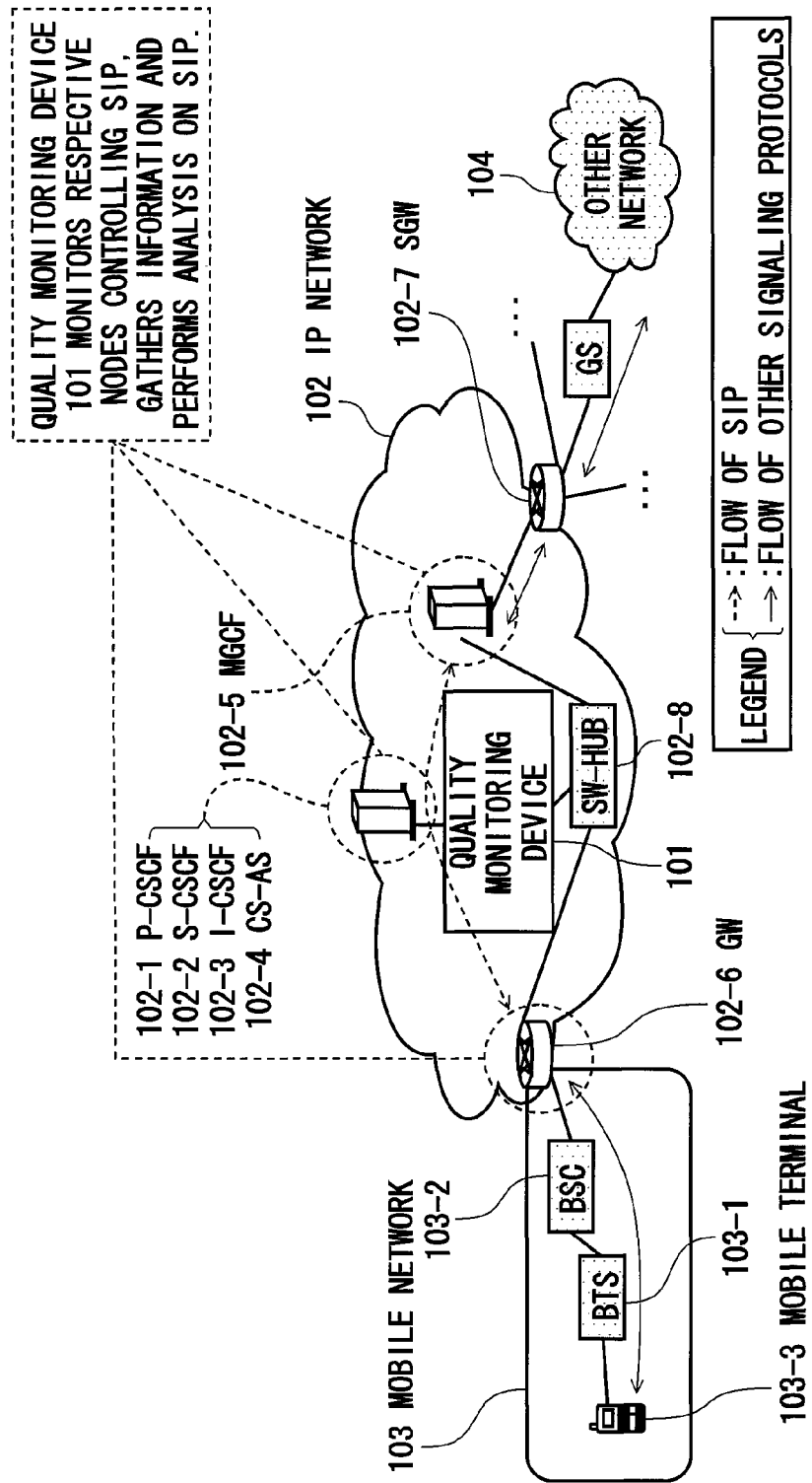
FIG. 1 is an overall configuration diagram of a network to which an embodiment is to be applied.

Since the background art described above requires that all path combinations be envisioned, there is a problem in that applying the technique to a network of an enormous scale such as the current Internet is unrealistic.

In addition, when an IP network employs a tree structure, connection information between network devices and user information stored in the network devices are associated to each other and managed in advance. A conceivable control assumes, upon the occurrence of a failure, that all users housed in a user's side of the network as seen from the failure site are affected.

Furthermore, when an IP network employs a mesh structure, a conceivable method involves narrowing down an affected range through call tests performed between contrapositions (between area codes).

The aforementioned techniques which assume a tree structure or a mesh structure are also unrealistic when considering applying such techniques to an entire network such as an IP telephone network which is controlled based on a signaling protocol.

Such an IP telephone network technique uses a protocol enabling an Internet service such as a signaling protocol-based IP telephone service to convey data in packets and, even when a failure occurs in the network, enables an audio packet to reach a final destination by detouring the failure site. Therefore, the services described above are problematic in that, during the occurrence of a failure, it is difficult to accurately determine on a peer-to-peer level whether the effect of the failure to the service has been avoided by detouring or whether the detour path has also been blocked and the service affected, and to identify an affected range.

In consideration of the above, the technique disclosed herein enables, in an Internet service controlled based on a signaling protocol, network quality to be monitored promptly.

An aspect of the disclosed technique premises a network quality monitoring device which monitors network quality in an Internet service operated on an IP network where communication is performed based on an Internet protocol and which controls communication states based on a signaling protocol.

A packet receiving unit receives a packet with which a signaling protocol server device, which is a server device that processes a signaling protocol and which receives a request from a client, communicates with the IP network.

A signaling protocol packet extracting unit extracts signaling protocol packets for controlling a signaling protocol from packets received by the packet receiving unit.

A signaling protocol packet analyzing unit analyzes signaling protocol packets which are extracted by the signaling protocol packet extracting unit and which are used for establishing communication sessions respectively transmitted and received at an ingress and an egress of a signaling protocol server device in order to manage transition of session states and manage, as a session management table, signaling protocol information obtained from signaling protocol packets and session states in association with each other on a per-session basis and on a per-ingress and per-egress basis.

A session management table storing unit stores session management tables.

A signaling protocol quality analyzing unit collects quality information regarding network quality from a session management table corresponding to a session having transitioned to a predetermined communication state among session management tables stored in the session management table storing unit, and based on the collection result, analyzes statistical information regarding network quality.

A statistical information notifying unit notifies quality information and statistical information obtained by the signaling protocol quality analyzing unit.

According to the disclosed technique, instead of collecting statistical information by a signaling protocol server, signaling protocol quality information can now be collected by a network-side network quality monitoring device.

In addition, even during a period where the signaling protocol server is suspended due to a failure, quality information such as the state of traffic to the signaling protocol server can be collected including before and after the suspension.

Furthermore, since the signaling protocol server is not subjected to any processing load when collecting quality information, a network quality state can be grasped without affecting the processing capabilities of the signaling protocol server.

It is now possible to collect, from the network side, the same traffic amount as the traffic amount of a signaling protocol session processed by the signaling protocol server that is a monitoring subject, and network operation management can be performed in an appropriate manner.

A network administrator can now respectively grasp, with respect to a monitoring subject server, a control quality state of a signaling protocol session at an ingress thereof, a control quality state of the signaling protocol session at an egress thereof, and a total signaling protocol session quality state combining the ingress and the egress.

In addition, network quality can now be monitored by merely analyzing a signaling protocol packet for establishing a communication session without monitoring the session once the session has transitioned to an "ongoing" state. As a result, prompt quality monitoring is possible.

Hereinafter, an embodiment will be described in detail with reference to the drawings.

FIG. 1 is an overall configuration diagram of a network to which the present embodiment is to be applied. The network is realized as an NGN network. NGN stands for an IP-technique-based Next Generation Network that is safe and highly reliable like a land line, but at the same time aims to obtain the degree of freedom enjoyed by an IP network. International standardization thereof by ITU-T is underway. With an NGN, in addition to the conventional services of land line phones and mobile phones, high-quality video distribution, videotelephony, high-reliability communication services for the corporate sector, and the like are to be provided over the same IP network.

An IP network 102 that realizes an NGN is interconnected to networks operated by protocols other than an IP protocol such as a mobile network 103 or another network 104.

The present embodiment is realized as a quality monitoring device 101 inside the IP network 102. The quality monitoring device 101 monitors respective nodes described below and denoted as 102-1 to 102-6, and performs collection and analysis under SIP. The respective nodes implement control of SIP.

In FIG. 1, a P-CSCF (Proxy Call Session Control Function) 102-1 is a device recommended as a component of the NGN realized by the IP network 102. The device provides a function for forwarding an SIP message from a terminal to an I-CSCF and an S-CSCF to be described later, and the like.

An S-CSCF (Serving Call Session Control Function) 102-2 is also a device recommended as a component of the NGN realized by the IP network 102. The device provides a call control function for realizing communication in the IP network. The device also works in conjunction with an SIP application server.

An I-CSCF (Interrogating Call Session Control Function) 102-3 is also a device recommended as a component of the NGN realized by the IP network 102. The device provides a function for selecting, when registering a terminal in the network, an appropriate S-CSCF from a plurality of existing S-CSCFs, a security function for protecting its own network configuration from other networks, and the like.

A CS-AS (Call Session Application Server) 102-4 is also a device recommended as a component of the NGN realized by the IP network 102. The device is an application server that provides a line switching service to a 3G mobile network.

An MGCF (Media Gateway Control Function) 102-5 is also a device recommended as a component of the NGN realized by the IP network 102. The device becomes necessary when interconnecting with an existing telephone network. The device provides a function for controlling an SGW 102-7, to be described next.

The SGW (Service Gateway) 102-7 is a device recommended as a component of the NGN realized by the IP network 102. The device provides a connection function between networks of different types. For example, the SGW performs audio CODEC (COder/DECoder) conversion and protocol conversion with respect to a VoIP (Voice over IP) network. In addition, for example, the SGW houses a TDM (Time Domain Multiplexing) line. Furthermore, for example, the SGW houses an ATM (Asynchronous Transfer Mode) line and performs ATM protocol conversion. Moreover, for example, SGW houses an IP line and performs IP protocol conversion.

A GW (Gateway) 102-6 is also a device recommended as a component of the NGN realized by the IP network 102. The device is disposed on the IP network side and provides a relay function between a VoIP (Voice over IP) network and a mobile network.

An SW-HUB (Switching HUB) 102-8 is also a device recommended as a component of the NGN realized by the IP network 102. The device provides connections between the respective devices described above as well as between terminals in the IP network.

A BTS (Base Transceiver Station) 103-1 is a device that is a component of the mobile network 103. The device converts data from a network-side wired line into a data format compatible with a wireless interface, and conveys the converted data in a wireless frequency to a mobile terminal 103-3 existing in its own cell. Conversely, the BTS converts data from the mobile terminal 103-3 conveyed in a wireless frequency into a data format compatible with a wired interface, and conveys the converted data to the network side.

A BSC (Base Station Controller) 103-2 is also a device that is a component of the mobile network 103. The device handles a relay function between the BTS and an existing network.

For example, a case is presented where the mobile terminal 103-3 having made a call from inside the mobile network 103 communicates via the IP network 102 with the other network 104. The GW 102-6 connecting the mobile network 103 with the IP network 102 converts signaling of the mobile network 103 into SIP signaling, and performs signaling inside the IP network 102. In the IP network 102, the SIP servers of the respective nodes including the GW 102-6, the P-CSCF 102-1, the S-CSCF 102-2, the I-CSCF 102-3, the CS-AS 102-4, and the MGCF 102-5 control SIP signaling and carry out the connection.

Figure 2:
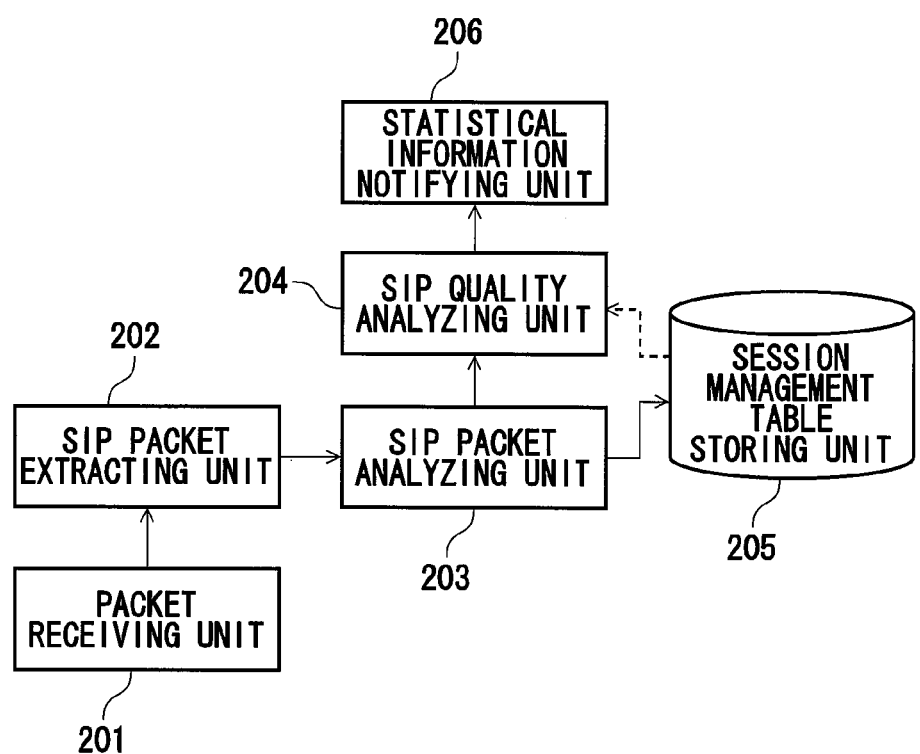
FIG. 2 is a configuration diagram of a quality monitoring device 101 according to an embodiment.

FIG. 2 is a configuration diagram of the quality monitoring device 101 according to the present embodiment illustrated in FIG. 1. The device is connected as a probe device to IP line portions housed by the respective SIP servers denoted by the reference characters 102-1 to 102-6 in FIG. 1.

In FIG. 2, a packet receiving unit 201 is connected to a mirror port of the SW-HUB 102-8 illustrated in FIG. 1 or the like, receives an IP packet inputted to or outputted from a monitoring subject SIP server and transmits the received IP packet to an SIP packet extracting unit 202.

The SIP packet extracting unit 202 extracts only an SIP packet from packets received from the packet receiving unit 201, and transmits the extracted SIP packet to an SIP packet analyzing unit 203. Whether or not a packet is an SIP packet is determined by referencing a header portion of a transport layer of the packet and determining whether a destination port number is an SIP port number or not. As for the SIP port number to be used for the determination, in addition to 5060 or 5061 which are well known ports in SIP, a port number decided under a network policy may be set in advance by config and the like.

The SIP packet analyzing unit 203 receives the extracted SIP packet from the SIP packet extracting unit 202, analyzes an SIP signal, and performs SIP session state management.

FIGS. 3 and 4 are diagrams illustrating examples of SIP messages. FIG. 3 is an example of an INVITE method that is an SIP request for initiating a session. In addition, FIG. 4 is an example of an SIP response to the INVITE method. An SIP message has a structure that closely resembles the structure of e-mail data and, as illustrated in FIG. 3 or 4, is made up of an SIP header 301 or 401 and a body text 302 or 402. The SIP packet analyzing unit 203 analyzes the SIP header 301 or 401 of the SIP message.

A session state and session information that is effective in quality analysis are retained in a session management table to be stored in a session management table storing unit 205. In a session management table, a single entry is allocated to each session. A session is identified using information unique to a session such as a Call-ID. A session management table discriminates between packets to the ingress of a monitoring subject SIP server and packets from the egress of the monitoring subject SIP server, controls session states of the ingress and egress, and retains session information.

An SIP quality analyzing unit 204 references a session management table in which an SIP session state and session information have been retained by the SIP packet analyzing unit 203, and analyzes the information. Accordingly, the SIP quality analyzing unit 204 identifies a completion or non-completion (quasi-normal, abnormal) of a session, identifies a connection time up to the moment a caller becomes aware of a session ringing state (180 Ringing reception), identifies the time required by an SIP server to process a call connection signal, and the like. Subsequently, the SIP quality analyzing unit 204 analyzes all of a plurality of sessions to become analysis subjects, and aggregates the analysis results as statistical information. In addition, by defining, in advance, a threshold of statistical data to be determined a quality deterioration, the SIP quality analyzing unit 204 also determines notifying the network administrator of a quality deterioration by way of an alarm when the threshold is exceeded.

A statistical information notifying unit 206 provides statistical information collected by the SIP quality analyzing unit 204 to the network administrator. In addition, the statistical information notifying unit 206 notifies an alarm to the network administrator.

The session management table storing unit 205 stores session management tables.

FIG. 5 is a data configuration diagram illustrating information stored in a single session management table.

A session management table is a table that manages session states (call setup, ringing, ongoing, and the like) as well as session information.

A session management table retains, as session common information, a session management completion flag and SIP header information. SIP header information includes a Call-ID, caller information (From) in SIP-URI format, and callee information (To) in SIP-URI format.

In addition, a session management table retains, respectively for the ingress and the egress of a monitoring subject SIP server, a destination IP address, a source IP address, a session state, a final response code, a completion/noncompletion display, and a time of reception of each SIP message (plurality allowed).

Figure 6A:
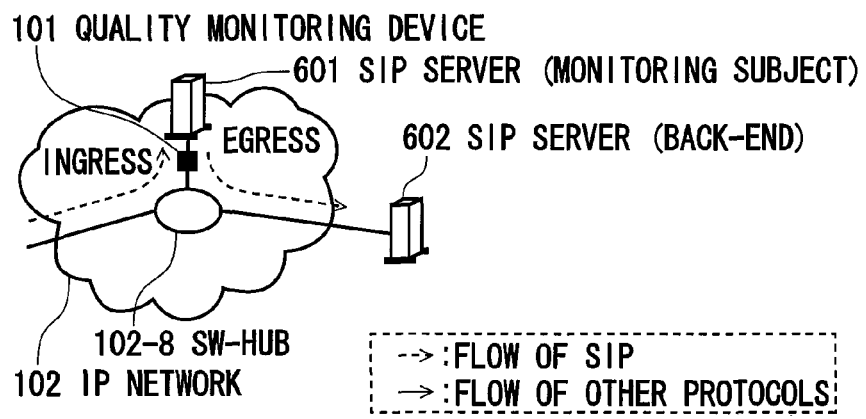
FIGS. 6A, 6B, and 6C are illustrative diagrams of an operational overview according to an embodiment.
Figure 6B:
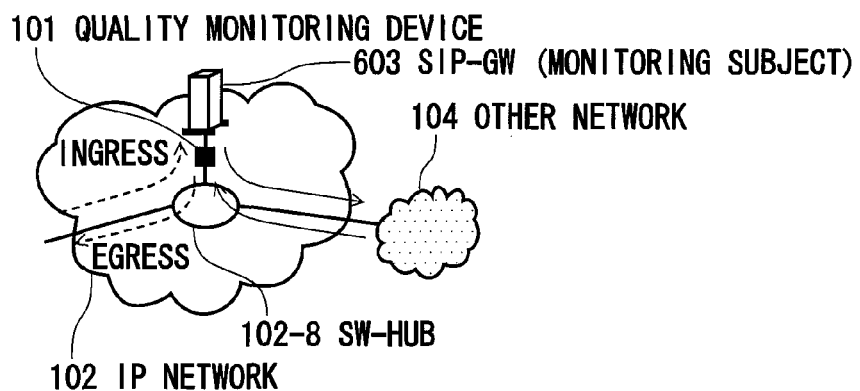
Figure 6C:
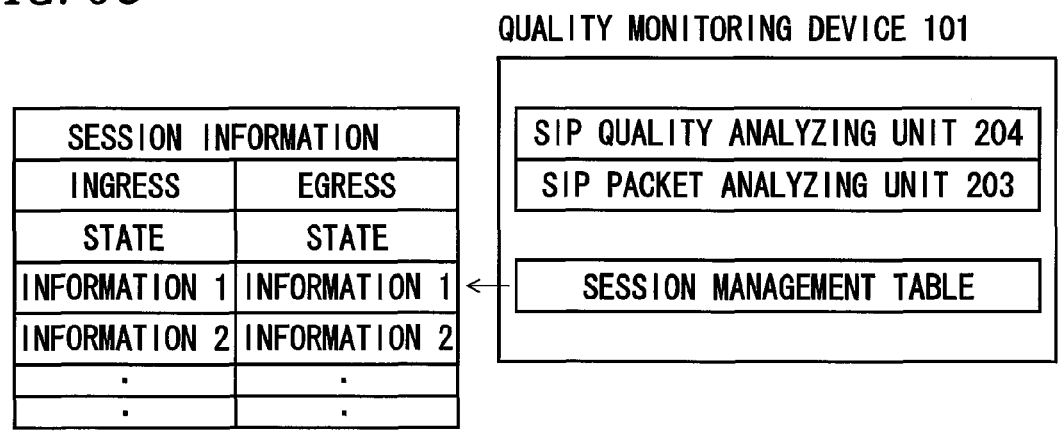

FIGS. 6A, 6B and 6C are illustrative diagrams of an operational overview according to the present embodiment. In FIGS. 6A and 6B, the quality monitoring device 101, the IP network 102, the other network 104, and the SW-HUB 102-8 are respectively the same as those illustrated in FIG. 1. In addition, an SIP server 601 corresponds to the respective SIP servers 102-1 to 102-4 illustrated in FIG. 1. An SIP-GW (gateway) 603 corresponds to the SIP gateway devices 102-5 or 102-6 illustrated in FIG. 1.

First, as illustrated in FIG. 6A, in the present embodiment, instead of having quality monitoring be performed at the monitoring subject SIP server 601 in the IP network 102, the quality monitoring device 101 is disposed at a mirror port of the SW-HUB 102-8 and the like to which the SIP server 601 is to be connected. The quality monitoring device 101 then captures inputted/outputted packets to/from the monitoring subject SIP server 601 and performs quality analysis thereon. Consequently, the SIP control quality of the monitoring subject SIP server 601 can be grasped without being affected by a failure state of the SIP server 601 and without affecting the processing capabilities of the SIP server 601.

An SIP session used in the IP network 102 illustrated in FIG. 1 which is an NGN or the like realizes session connection via the SIP server 601. The SIP server 601 implements an SIP signal proxy in order to establish a single SIP session.

The quality monitoring device 101 disposed on the IP network 102 captures both packets flowing through the ingress and packets flowing through the egress of the monitoring subject SIP server 601. In addition, based on information such as a Call-ID that uniquely identifies a single SIP session, the quality monitoring device 101 attaches all session connecting packets flowing through the ingress and egress of the SIP server 601, and respectively manages session states for the ingress and the egress. As illustrated in FIG. 6C, the quality monitoring device 101 manages a session state using a session management table including data such as that illustrated in FIG. 5. The session management table is stored in the session management table storing unit 205 illustrated in FIG. 2.

The quality monitoring device 101 becomes capable of determining, respectively for the ingress and the egress, whether a session connection is complete or incomplete. At the same time, the quality monitoring device 101 becomes capable of comprehensively determining session connection results of the ingress and egress, and determining, for each unit made up of a single SIP session controlled by the monitoring subject SIP server 601, whether the session connection is complete or incomplete.

In addition, the quality monitoring device 101 performs the aforementioned determination on all sessions inputted to or outputted from the monitoring subject SIP server 601, and an implementation result thereof is provided to the network administrator as statistical information.

Furthermore, the quality monitoring device 101 respectively performs session state management on the ingress and the egress of the SIP server 601. Accordingly, upon non-completion of a session connection, it is now possible to determine whether the noncompletion was caused by the monitoring subject SIP server 601 or by a back-end SIP server 602 of the monitoring subject SIP server 601. A failed server or a failed network becomes identifiable by tracking quality data of each server.

Next, in FIG. 6B, the SIP-GW (gateway) 603 connects the other network 104 that is operated under a different protocol to the IP network 102. In this case also, instead of having quality monitoring be performed at the monitoring subject SIP-GW 603 in the IP network 102, the quality monitoring device 101 is disposed at a mirror port of the SW-HUB 102-8 or the like to which the SIP-GW 603 is to be connected.

In the direction in which an SIP message is forwarded from the IP network 102 to the other network 104, the quality monitoring device 101 only monitors the ingress of the monitoring subject SIP-GW 603. This is because no SIP messages will be sent out from the egress of the SIP-GW 603. On the other hand, in the direction in which an SIP message is forwarded from the other network 104 to the IP network 102, the quality monitoring device 101 only monitors the egress of the monitoring subject SIP-GW 603. This is because no SIP messages will flow into the ingress of the SIP-GW 603.

In this case, the quality monitoring device 101 primarily collects and monitors connection times when SIP messages are sequentially forwarded.

Next, a description will be given on details of operations for identifying SIP request packets and SIP response packets at the ingress and egress of a monitoring subject SIP server in the present embodiment.

Figure 7:
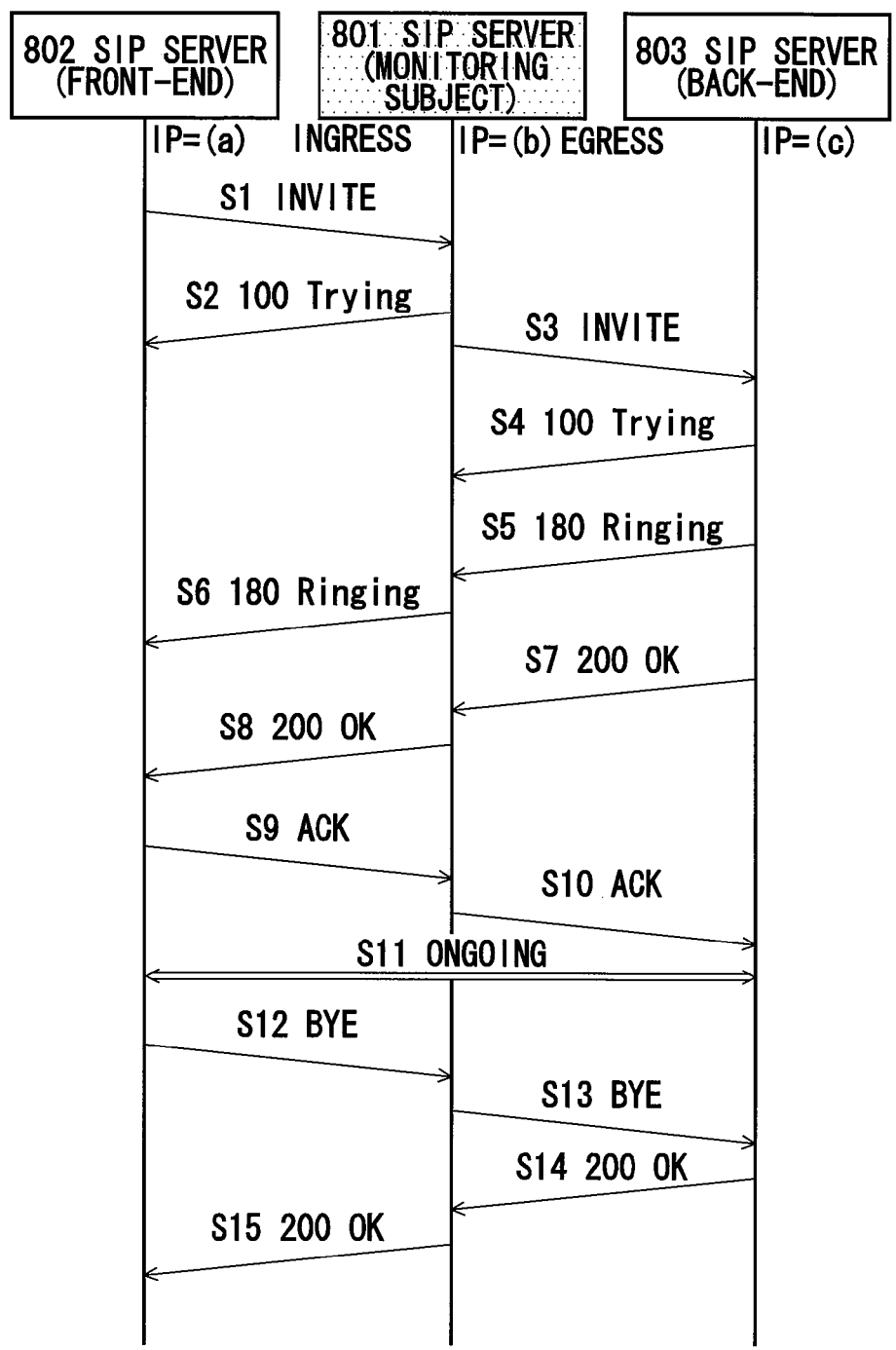
FIG. 7 is a diagram illustrating an operational sequence example of a general SIP proxy.

FIG. 7 is a diagram illustrating an operational sequence example of a general SIP proxy, and FIGS. 8A and 8B form an operational illustrative diagram thereof. In FIG. 8A, the quality monitoring device 101, the IP network 102, and the SW-HUB 102-8 are respectively the same as those illustrated in FIG. 1. In addition, SIP servers 801 to 803 correspond to the respective SIP servers 102-1 to 102-4 illustrated in FIG. 1.

First, an INVITE request SIP message is issued from a front-end SIP server 802 to a monitoring subject SIP server 801 to request session establishment (S1 in FIG. 7). The front-end SIP server 802 may incorporate or be connected to a calling terminal.

Upon receiving the INVITE request, the monitoring subject SIP server 801 sends a 100 Trying response, which is an SIP message indicating that the request is being forwarded, to the front-end SIP server 802 (S2 in FIG. 7).

Subsequently, the monitoring subject SIP server 801 forwards the INVITE request to a back-end SIP server 803 (S3 in FIG. 7). The back-end SIP server 803 may incorporate or be connected to a called terminal.

Having received the INVITE request, the back-end SIP server 803 further attempts to forward the INVITE request if a communication destination SIP server or terminal exists. At this point, a 100 Trying response is also sent back from the back-end SIP server 803 to the monitoring subject SIP server 801 (S4 in FIG. 7).

The SIP server which had last called a terminal returns a 180 Ringing response that is an SIP message indicating ringing to a previous SIP server. As a result of the response being forwarded, a 180 Ringing response is sent back from the back-end SIP server 803 to the monitoring subject SIP server 801 (S5 in FIG. 7). The monitoring subject SIP server 801 forwards the 180 Ringing response to the front-end SIP server 802 (S6 in FIG. 7).

When the called terminal responds to the ringing, a 200 OK response is sent back as an SIP message. As a result of the response being forwarded, a 200 OK response is sent back from the back-end SIP server 803 to the monitoring subject SIP server 801 (S7 in FIG. 7). The monitoring subject SIP server 801 forwards the 200 OK response to the front-end SIP server 802 (S8 in FIG. 7).

With respect to the aforementioned 200 OK response, an ACK message is sent back from the front-end SIP server 802 to the monitoring subject SIP server 801 as an SIP message indicating a response (S9 in FIG. 7). Similarly, an ACK message is sent back from the monitoring subject SIP server 801 to the back-end SIP server 803 (S10 in FIG. 7).

After the sequence described above, the calling terminal and the called terminal enter an ongoing state (S11 in FIG. 7).

After communication is terminated, a BYE message is transmitted as an SIP message indicating termination from, for example, the front-end SIP server 802 to the monitoring subject SIP server 801 (S12 in FIG. 7). Subsequently, the monitoring subject SIP server 801 forwards the BYE message to the back-end SIP server 803 (S13 in FIG. 7).

In response thereto, a 200 OK response is sent back from the back-end SIP server 803 to the monitoring subject SIP server 801 (S14 in FIG. 7), and a 200 OK response is also sent back from the monitoring subject SIP server 801 to the front-end SIP server 802 (S15 in FIG. 7).

Communication is thereby terminated.

As described above, in regards to SIP signals, a single request ends when an SIP response is made to an SIP request. Therefore, in FIG. 8A, it is necessary for the quality monitoring device 101 to respectively capture an SIP request and an SIP response, and respectively determine whether the message is to the ingress or from the egress. The SIP packet analyzing unit 203 illustrated in FIG. 2 determines whether an SIP message is to the ingress or from the egress according to the logic illustrated in FIG. 8B. Subsequently, upon receiving an INVITE request, the SIP packet analyzing unit 203 allocates a session management table for a session corresponding to the INVITE request. In a normal SIP proxy sequence such as that illustrated in FIG. 7, a session management table is allocated when an INVITE request is received at the ingress (the case of 51 illustrated in FIG. 7). When an INVITE request is received at the egress (the case of S3 illustrated in FIG. 7), an already-allocated session management table is to be used.

An IP address=(b) of the monitoring subject SIP server 801 is known in advance by the quality monitoring device 101. In addition, a plurality of IP addresses can be identified as the monitoring subject SIP server 801.

In the course of the SIP proxy operational sequence exemplified in FIG. 7, upon receiving an SIP packet, the SIP packet analyzing unit 203 respectively retains, for the ingress and egress, the session management table illustrated in FIG. 5 in the session management table storing unit 205 illustrated in FIG. 2. Subsequently, according to the reception state of the SIP packet, the SIP packet analyzing unit 203 executes session state management indicated by the state transitions illustrated in FIG. 9 while controlling the session management table. In other words, every time an SIP message is received, the SIP packet analyzing unit 203 transitions a current state among states S901 to S911

While details of the state transition operation will be described later, when session states of the ingress and the egress become a quality analysis subject state, a "session management completion flag" of the session management table illustrated in FIG. 5 is switched "ON". Reference characters S905, S906, S907, S909, and S911 illustrated in FIG. 9 denote quality analysis subject states.

Among the group of session management tables stored in the session management table storing unit 205, the SIP quality analyzing unit 204 illustrated in FIG. 2 collects quality information on sessions whose session management completion flags have been switched to "ON". Quality information include completion/noncompletion, connection times, signal processing times by the monitoring subject SIP server 801 (FIG. 8A), and the like with respect to ingress and egress sessions. The SIP quality analyzing unit 204 aggregates, within a certain period, quality information of all sessions set as quality analysis subjects as statistical information, and notifies the statistical information to a maintenance terminal (not particularly illustrated in FIG. 1) of the network administrator through the statistical information notifying unit 206.

While the completion/noncompletion of ingress and egress sessions are to be separately decided for the ingress and the egress, it is also conceivable that completion/noncompletion be decided on a single SIP session that combines the ingress and egress. In this case, it is necessary to determine completion or noncompletion based on respective information on the ingress and the egress. For example, if both the ingress and egress are in a completed state, the SIP session is assumed to be completed, and if both the ingress and egress are incomplete, the SIP session is assumed to be incomplete. However, cases are conceivable in which the ingress is incomplete but the egress is complete, or both the ingress and egress are incomplete although due to different noncompletion factors. In such cases, it is desirable that completion or noncompletion be decided in advance in accordance with the policy of the IP network 102 on which the quality monitoring device 101 is disposed. For example, it is conceivable that if either one of the ingress and egress is incomplete, the single SIP session is also assumed to be incomplete, and if noncomple- tion factors differ, weighting is to be applied to the noncompletion factors and whatever emphasized factor is to be adopted.

Figure 9:
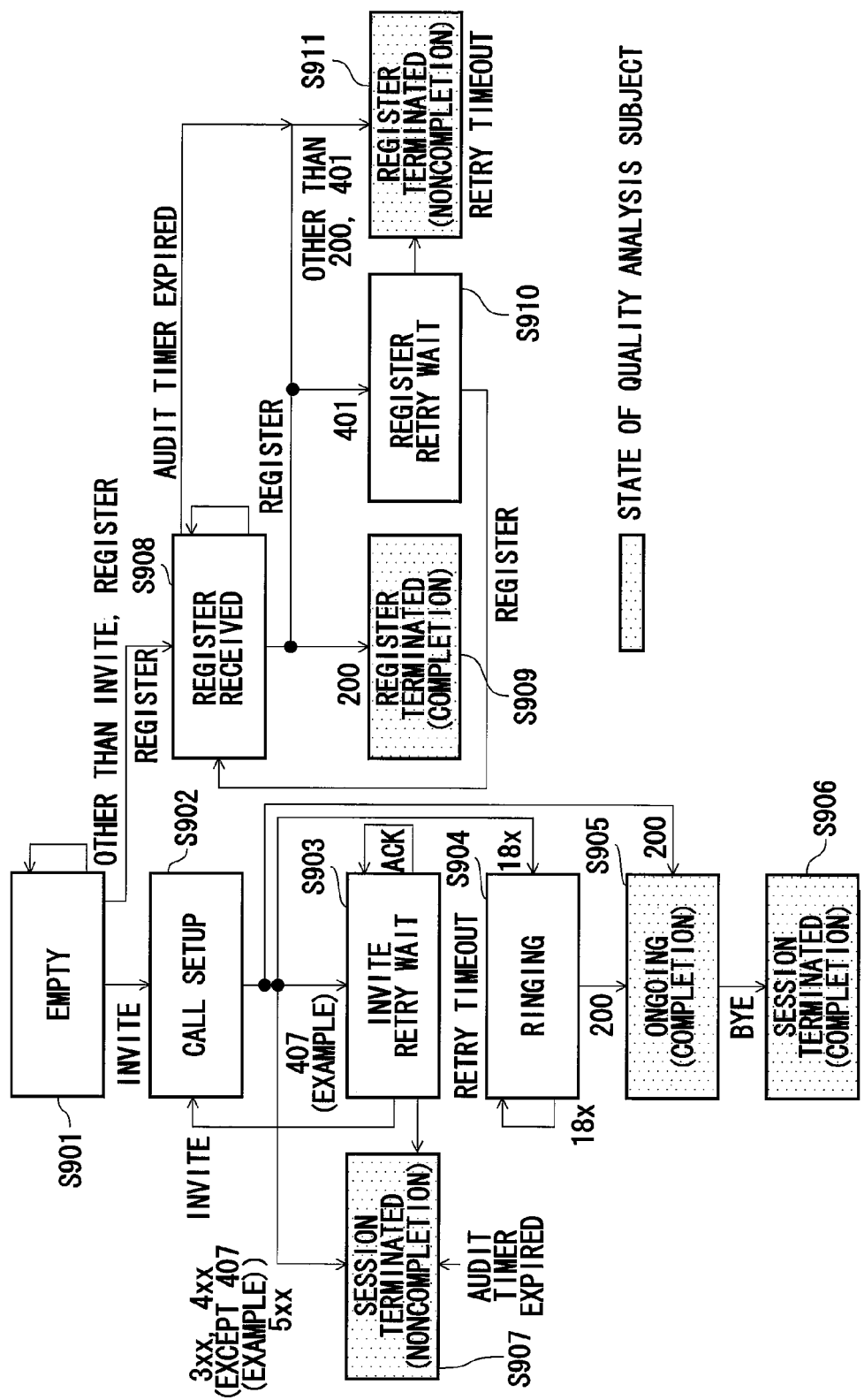
FIG. 9 is a state transition diagram illustrating control operations of an SIP packet analyzing unit 203.

FIGS. 10 to 22 are operational flow charts illustrating operations when the SIP packet analyzing unit 203 executes management of session states indicated by the state transitions illustrated in FIG. 9. Hereinafter, operations represented by the operational flow charts will be described in sequence.

First, the operational flow chart illustrated in FIG. 10 will be described.

First, in an empty state (S901 in FIG. 9), the SIP packet analyzing unit 203 analyzes contents of a received packet (step S1001). In this case, an "empty" state refers to a state where the SIP packet analyzing unit 203 is not performing call control on a subject SIP session.

Next, the SIP packet analyzing unit 203 judges whether the received packet is an SIP packet or not (step S1002).

When the SIP packet analyzing unit 203 judges in step S1002 that the received packet is not an SIP packet, the SIP packet analyzing unit 203 returns to the processing of step S1001 and analyzes the contents of the next received packet.

When the SIP packet analyzing unit 203 judges in step S1002 that the received packet is an SIP packet, the SIP packet analyzing unit 203 extracts an SIP message from the received packet and checks the format thereof (step S1003). An SIP message is in a format such as those exemplified in FIG. 3 or 4. In step S1003, necessary conditions for an SIP message to be formed are checked.

In the judgment of step S1004, if the check result is an error, the SIP packet analyzing unit 203 returns to the processing of step S1001 and analyzes the contents of the next received packet.

In the judgment of step S1004, if the check result is OK, the SIP packet analyzing unit 203 generates a hash value for identifying a session management table (step S1005). Specifically, the SIP packet analyzing unit 203 computes a hash value corresponding to a Call-ID (refer to FIGS. 3 and 4) that is session identification information in the SIP header of a received SIP message.

Figure 23:
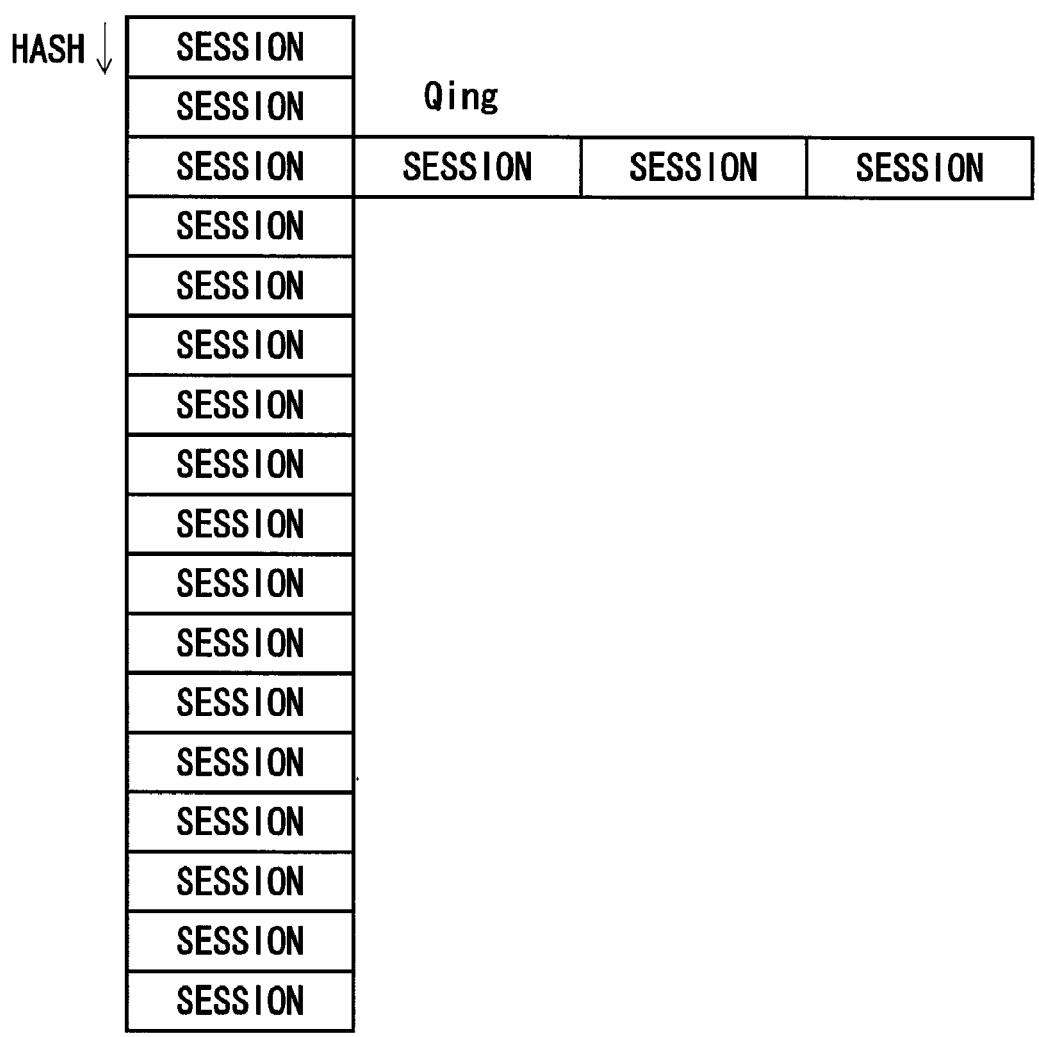
FIG. 23 is an operational illustrative diagram of hash search processing of a session management table.

Next, from the hash value, the SIP packet analyzing unit 203 identifies a session management table stored in the session management table storing unit 205. If there are no session management tables, the SIP packet analyzing unit 203 allocates a new session management table (heretofore step S1006). By using a hash value, as illustrated in FIG. 23, a session management table can be uniquely identified for each session and, furthermore, the same session management table can always be identified for the same session.

The SIP packet analyzing unit 203 then sets information in the SIP header of the received SIP message to the identified session management table (step S1007). Specifically, the SIP packet analyzing unit 203 sets, for example, a Call-ID, caller information (From), and callee information (To) which are session identification information in the SIP header 301 illustrated in FIG. 3 to fields corresponding to SIP header information illustrated in FIG. 5.

Next, the SIP packet analyzing unit 203 determines whether the received SIP message is a message of the ingress or the egress of the monitoring subject SIP server 801 (refer to FIG. 8A) (step S1008).

In this case, the decision rule illustrated in FIG. 8B is to be used.

That is, if the SIP message is an SIP request directed from the caller to the callee and the destination IP address (refer to FIG. 5) in the SIP header is set to the monitoring subject SIP server 801, the SIP message is judged to be an SIP message flowing through the ingress of the monitoring subject SIP server 801. In other words, the SIP message is an SIP request forwarded from the front-end SIP server 802 towards the monitoring subject SIP server 801. Whether an SIP request is directed from the caller to the callee or vice versa can be judged from information contained in the SIP header.

If the SIP message is an SIP request directed from the caller to the callee and the source IP address (refer to FIG. 5) in the SIP header is set to the monitoring subject SIP server 801, the SIP message is judged to be an SIP message flowing through the egress of the monitoring subject SIP server 801. In other words, the SIP message is an SIP request forwarded and transmitted from the monitoring subject SIP server 801 towards the back-end SIP server 803.

If the SIP message is an SIP response directed from the callee to the caller and the destination IP address in the SIP header is set to the monitoring subject SIP server 801, the SIP message is judged to be an SIP message flowing through the egress of the monitoring subject SIP server 801. In other words, the SIP message is an SIP response forwarded from the back-end SIP server 803 towards the monitoring subject SIP server 801.

If the SIP message is an SIP response directed from the callee to the caller and the source IP address in the SIP header is set to the monitoring subject SIP server 801, the SIP message is judged to be an SIP message flowing through the ingress of the monitoring subject SIP server 801. In other words, the SIP message is an SIP response forwarded and transmitted from the monitoring subject SIP server 801 towards the front-end SIP server 802.

If the SIP message is an SIP request directed from the callee to the caller and the destination IP address in the SIP header is set to the monitoring subject SIP server 801, the SIP message is judged to be an SIP message flowing through the egress of the monitoring subject SIP server 801. In other words, the SIP message is an SIP request forwarded from the back-end SIP server 803 towards the monitoring subject SIP server 801.

If the SIP message is an SIP request directed from the callee to the caller and the source IP address in the SIP header is set to the monitoring subject SIP server 801, the SIP message is judged to be an SIP message flowing through the ingress of the monitoring subject SIP server 801. In other words, the SIP message is an SIP request forwarded and transmitted from the monitoring subject SIP server 801 towards the front-end SIP server 802.

If the SIP message is an SIP response directed from the caller to the callee and the destination IP address in the SIP header is set to the monitoring subject SIP server 801, the SIP message is judged to be an SIP message flowing through the ingress of the monitoring subject SIP server 801. In other words, the SIP message is an SIP response forwarded from the front-end SIP server 802 towards the monitoring subject SIP server 801.

If the SIP message is an SIP response directed from the caller to the callee and the source IP address in the SIP header is set to the monitoring subject SIP server 801, the SIP message is judged to be an SIP message flowing through the egress of the monitoring subject SIP server 801. In other words, the SIP message is an SIP response forwarded and transmitted from the monitoring subject SIP server 801 towards the back-end SIP server 803.

In the event that the SIP packet analyzing unit 203 determines that the received SIP message flows through the ingress of the monitoring subject SIP server 801, whenever subsequently accessing the session management table identified in step S1006, the SIP packet analyzing unit 203 accesses an ingress information region. Conversely, in the event that the SIP packet analyzing unit 203 determines that the received SIP message flows through the egress of the monitoring subject SIP server 801, whenever subsequently accessing the session management table identified in step S1006, the SIP packet analyzing unit 203 accesses an egress information region. Hereinafter, the description "subject session management table" shall refer to whichever region corresponding to either the ingress or the egress judged in step S1008 among the ingress information region or the egress information region in the session management table identified in step S1006. The session management table is stored in the session management table storing unit 205 illustrated in FIG. 2.

Next, the SIP packet analyzing unit 203 judges the type (method) of the received SIP message (step S1009). The judgment is realized by determining a message description provided at the head of the SIP header of the SIP message.

The SIP packet analyzing unit 203 then executes processing on a per-received message basis in accordance with the result of the judgment described above (step S1010). The processing is illustrated in any of the operational flow charts in FIGS. 11 to 19.

Figure 10:
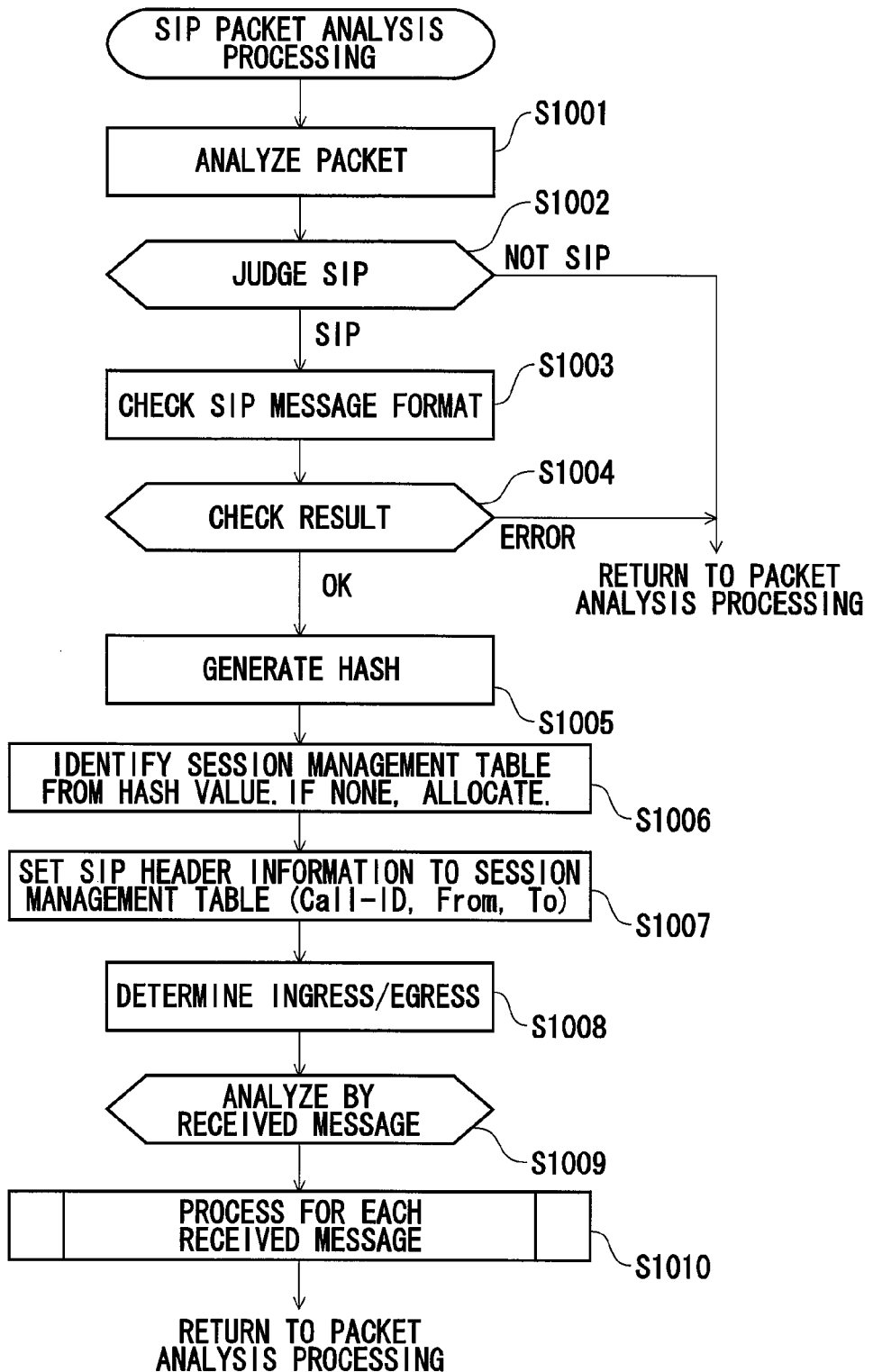
FIG. 10 is an operational flow chart illustrating control operations (overall processing) of the SIP packet analyzing unit 203.
Figure 11:
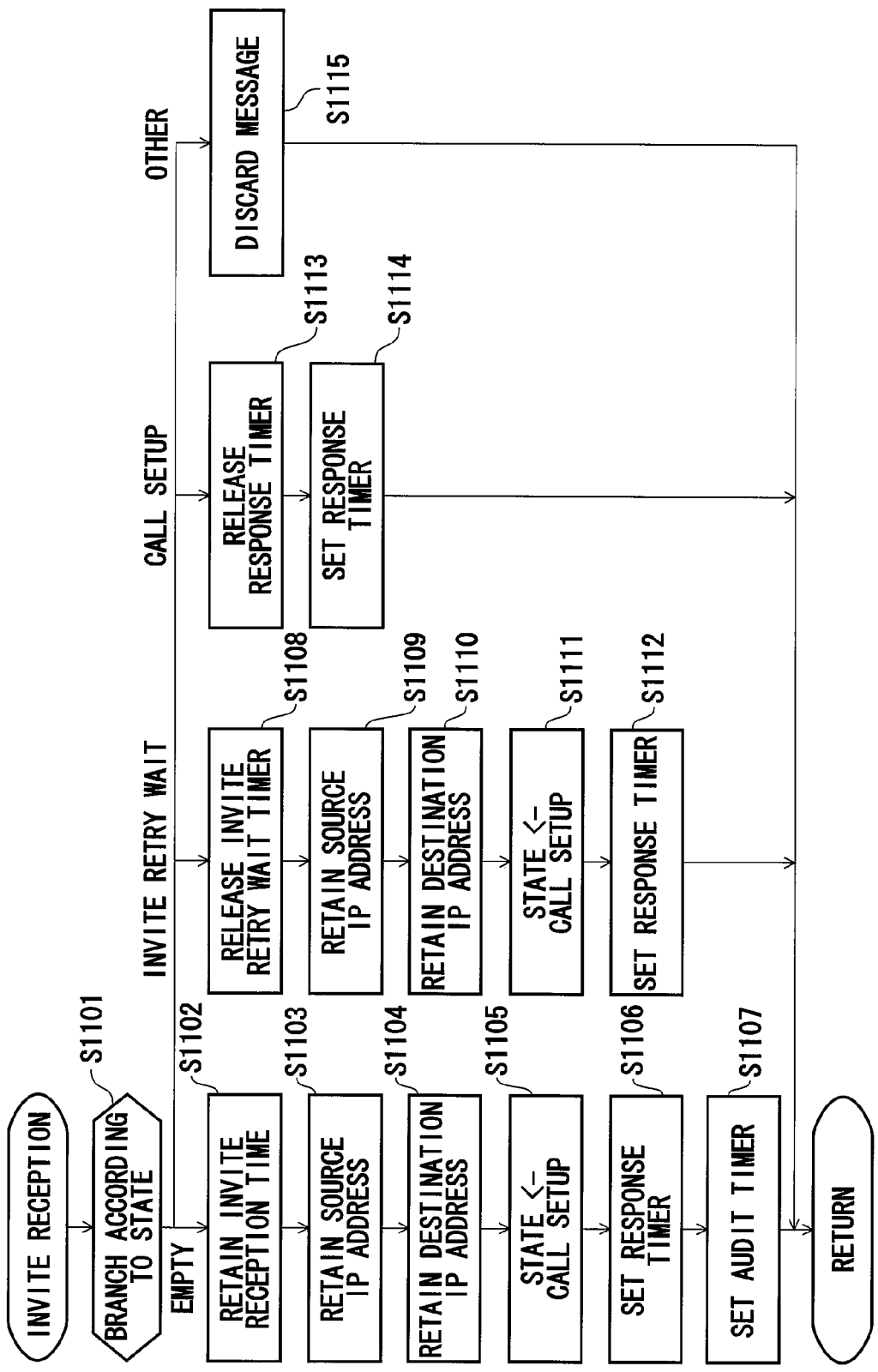
FIG. 11 is an operational flow chart illustrating control operations (reception processing of an INVITE request) of the SIP packet analyzing unit 203.

In step S1009 illustrated in FIG. 10, when the SIP packet analyzing unit 203 judges that the received message is an INVITE request, the SIP packet analyzing unit 203 executes the processing of the operational flow chart illustrated in FIG. 11. Hereinafter, operations according to the operational flow chart illustrated in FIG. 11 will be described.

First, the SIP packet analyzing unit 203 judges a current transition state of a relevant SIP session (step S1101). The judgment is realized by referencing the value of a "session state" field in the aforementioned subject session management table.

As a result of the judgment performed in step S1101, when the SIP packet analyzing unit 203 judges that the current transition state is an "empty" state (S901 in FIG. 9), the SIP packet analyzing unit 203 executes processing of steps S1102 to S1107.

In other words, the SIP packet analyzing unit 203 retains the time at which the INVITE request had been received in an "INVITE reception time" field (refer to FIG. 5) in the subject session management table (step S1102).

Next, the SIP packet analyzing unit 203 retains a source IP address in the header of the IP packet in which the INVITE request had been stored in a "source IP address" field (refer to FIG. 5) in the subject session management table (step S1103).

The SIP packet analyzing unit 203 then retains a destination IP address in the header of the IP packet in which the INVITE request had been stored in a "destination IP address" field (refer to FIG. 5) in the subject session management table (step S1104).

Next, the SIP packet analyzing unit 203 retains "call setup" in a "session state" field (refer to FIG. 5) in the subject session management table (step S1105). Accordingly, the transition state of the ingress or the egress of the SIP session represented by the subject session management table transitions from the "empty" state (S901 in FIG. 9) to the "call setup" state (S902 in FIG. 9).

Next, the SIP packet analyzing unit 203 sets a response timer in correspondence to a path of the ingress or the egress of the SIP session corresponding to the subject session management table, and starts the response timer (step S1106). The response timer is a timer that monitors any response in regards to the path of the ingress or the egress of the relevant SIP session. For example, when a response to the INVITE request is not returned, the expiration of the timer causes the SIP session (ingress or egress) to be determined incomplete and enables resources such as the session management table, various timers, and the like to be released. The period of time measured by the response timer is, for example, around 40 seconds. It is assumed that response timers can be generated within the SIP packet analyzing unit 203 to be operated individually. Processing upon the expiration of the response timer is to be executed based on the judgment of step S1009 illustrated in FIG. 10 and as the operational flow chart illustrated in FIG. 20 to be described later.

Next, the SIP packet analyzing unit 203 sets an Audit timer in correspondence to a path of the ingress or the egress of the SIP session corresponding to the subject session management table, and starts the Audit timer (step S1107). The Audit timer is a timer for preventing resources for session management from being wasted when a final response such as a 200 OK response cannot be received. A long period of time such as 5 minutes is to be measured by the Audit timer. It is assumed that Audit timers, in the same manner as response timers, can be generated within the SIP packet analyzing unit 203 to be operated individually. Processing upon the expiration of the Audit timer is executed based on the judgment of step S1009 illustrated in FIG. 10 and as the operational flow chart illustrated in FIG. 22 to be described later.

Subsequently, the SIP packet analyzing unit 203 terminates the processing of the operational flow chart illustrated in FIG. 11 and terminates the processing of step S1010 in FIG. 10.

Figure 25:
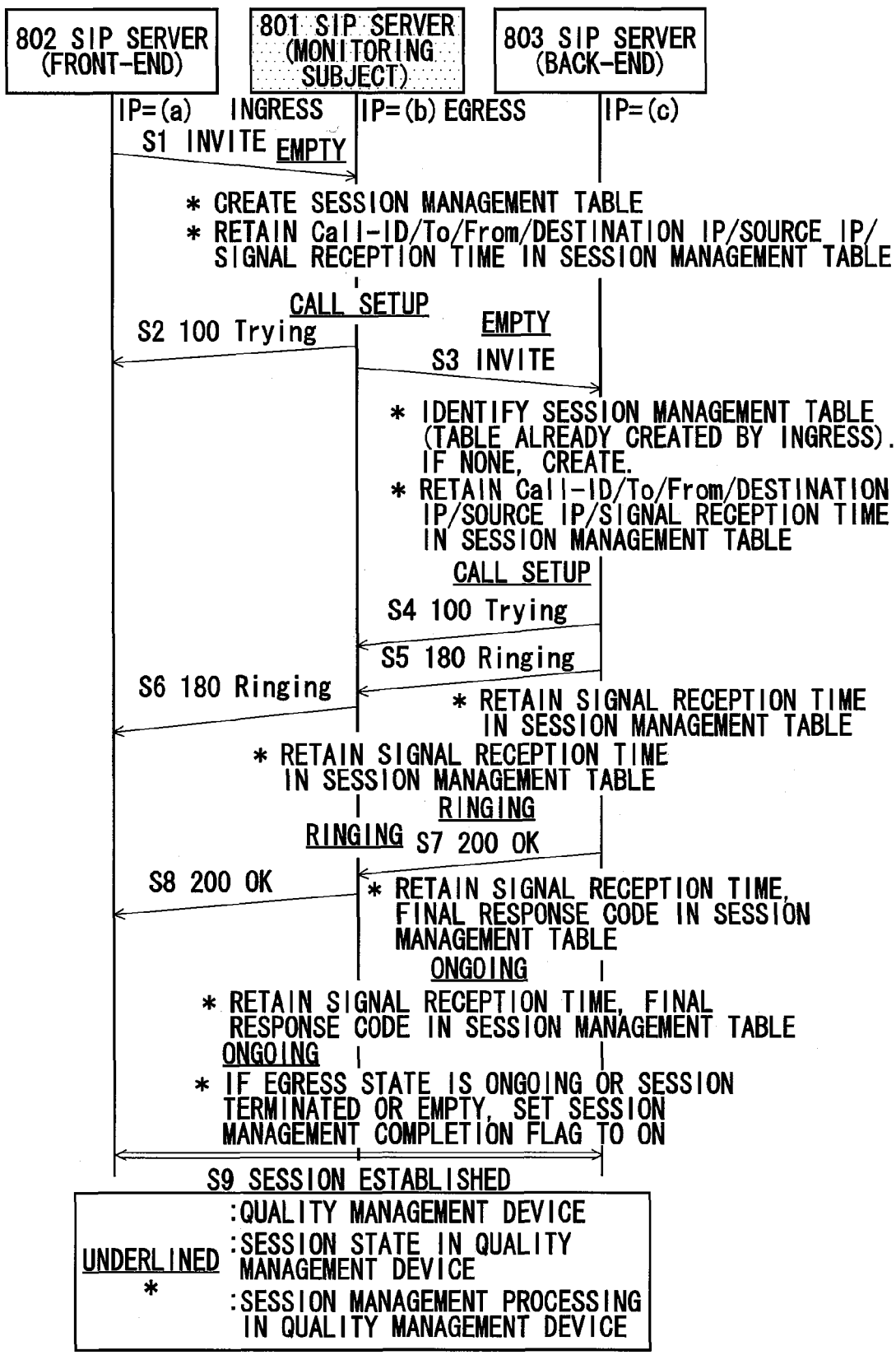
FIG. 25 is an operational sequence diagram illustrating an operation example (completion processing) according to an embodiment.
Figure 26:
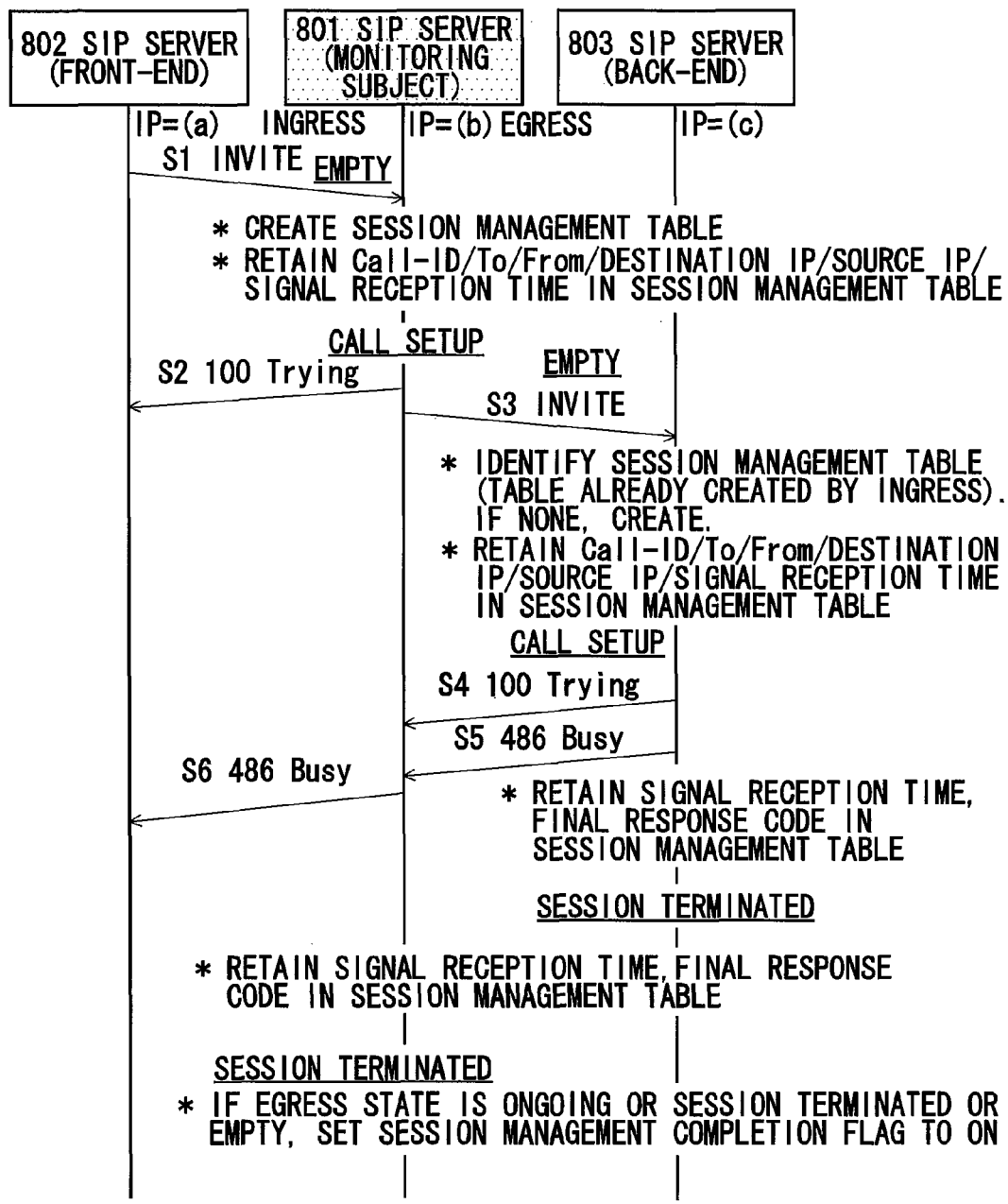
FIG. 26 is an operational sequence diagram illustrating an operation example (processing of noncompletion by a back-end SIP server) according to an embodiment.
Figure 27:
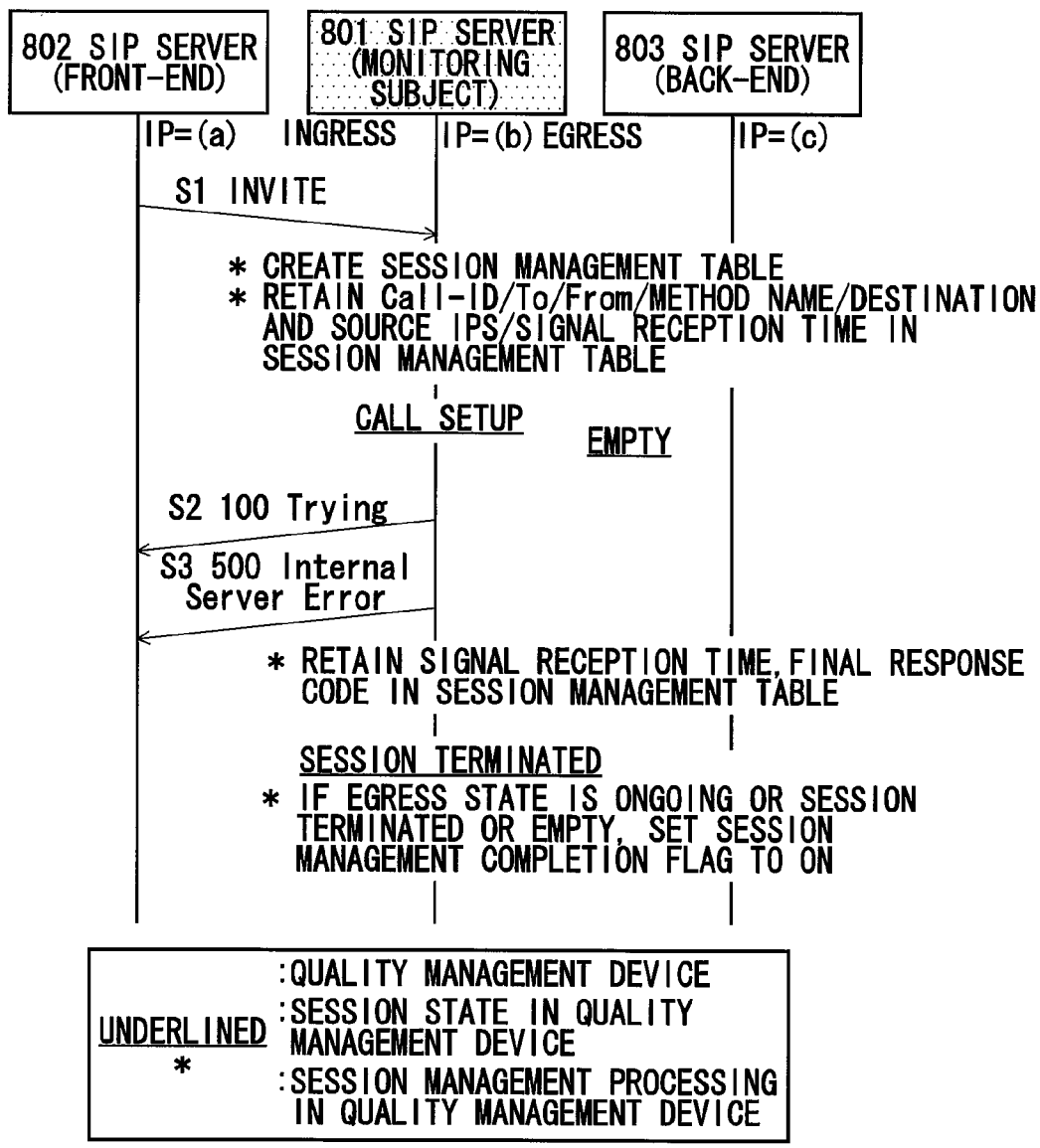
FIG. 27 is an operational sequence diagram illustrating an operation example (processing of noncompletion by a monitoring subject SIP server) according to an embodiment.

The operational sequence example made up of the series of processing of steps S1102 to S1107 described above corresponds to, for example, the respective S1 sequences illustrated in FIGS. 25 to 27 and to the respective S3 sequences illustrated in FIGS. 25 and 26.

As a result of the judgment performed in step S1101 described above, when the SIP packet analyzing unit 203 judges that the current transition state is an "INVITE retry wait" state (S903 in FIG. 9), the SIP packet analyzing unit 203 executes processing of steps S1108 to S1112.

Figure 24A:
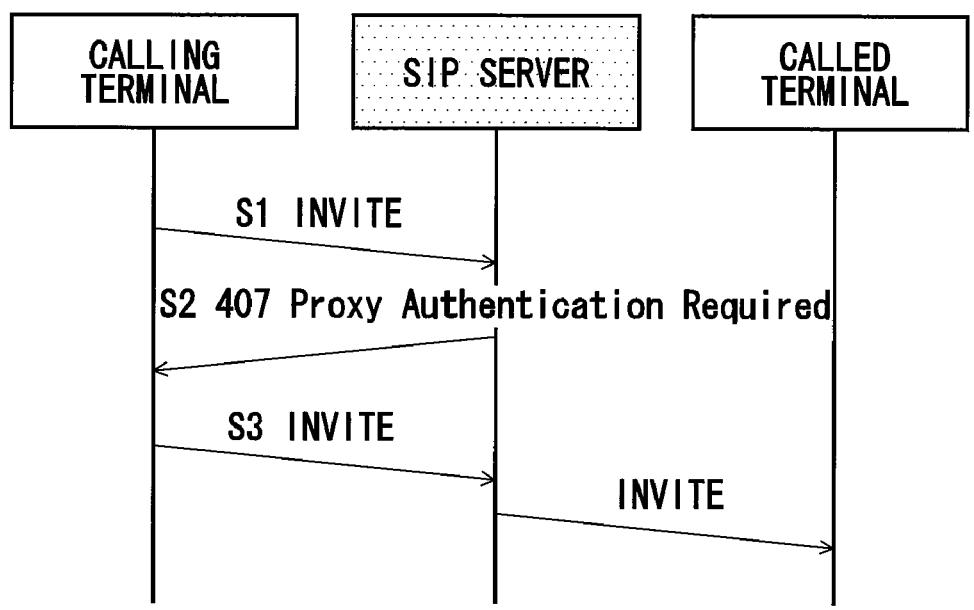
FIGS. 24A and 24B are operational sequence diagrams illustrating an operation example of request retry processing.

In this case, the "INVITE retry wait" state is exemplified as, for example, the operational sequence diagram illustrated in FIG. 24A. In other words, for example, there is a case where an authentication request is made from the side of an SIP server to a terminal or the like after the SIP server receives an INVITE request (S1) from the terminal or the like. In this case, a special response called "407 Proxy Authentication Required" is returned from the SIP server to the terminal or the like (S2). In response thereto, an INVITE request is once again sent from the terminal to the SIP server (S3). When the aforementioned 407 response is received, the SIP packet analyzing unit 203 transitions from the "call setup" state (S902 in FIG. 9) to the "INVITE retry wait" state (S903 in FIG. 9). The transition processing will be described later with reference to the operational flow chart illustrated in FIG. 13. When an INVITE request is further received in this state (S3 in FIG. 24A), the SIP packet analyzing unit 203 once again returns the transition state from the "INVITE retry wait" state to the "call setup" state (S902 in FIG. 9). This is realized by the series of processing of steps S1108 to S1112 illustrated in FIG. 11.

First, the SIP packet analyzing unit 203 releases an INVITE retry wait timer set in regards to a path of the ingress or the egress of an SIP session corresponding to the subject session management table (step S1108). The timer has been set and started in step S1305 illustrated in FIG. 13, to be described later, upon the reception of the aforementioned 407 response. Due to the release of the timer, in the "INVITE retry wait" state, the time count for waiting for the next INVITE request is terminated.

Next, as a series of processing of steps S1109 to S1112, the SIP packet analyzing unit 203 retains a source IP address and a destination IP address in the subject session management table, sets the "call setup" state, and sets and starts a response timer. The processing is the same as the series of processing of steps S1103 to S1106 described earlier.

Subsequently, the SIP packet analyzing unit 203 terminates the processing of the operational flow chart illustrated in FIG. 11 and terminates the processing of step S1010 in FIG. 10.

As a result of the judgment performed in step S1101 described above, when the SIP packet analyzing unit 203 judges that the current transition state is the "call setup" state (S902 in FIG. 9), the SIP packet analyzing unit 203 executes processing of steps S1113 and S1114. This is a case where, for example, after the "call setup" state is set upon the reception of an INVITE request, an INVITE request is repeatedly received.

In this case, the SIP packet analyzing unit 203 temporarily releases the response timer (step S1113), executes only the processing for resetting the response timer (step S1114), terminates the processing of the operational flow chart illustrated in FIG. 11, and terminates the processing of step S1010 in FIG. 10. In this case, the "call setup" state (S902 in FIG. 9) is maintained without modification.

As a result of the judgment of step S1101 described above, when the SIP packet analyzing unit 203 judges that the current transition state is neither the "empty" state nor the "INVITE retry wait" state nor the "call setup" state, the SIP packet analyzing unit 203 ignores and discards the INVITE request (step S1115).

Subsequently, the SIP packet analyzing unit 203 terminates the processing of the operational flow chart illustrated in FIG. 11 and terminates the processing of step S1010 in FIG. 10.

Figure 12:
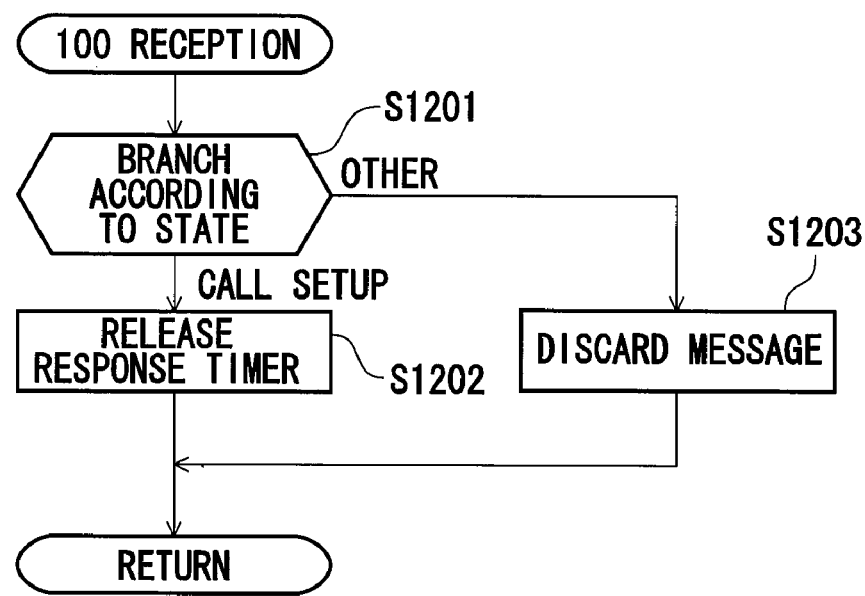
FIG. 12 is an operational flow chart illustrating control operations (reception processing of a 100 Trying response) of the SIP packet analyzing unit 203.

Next, in step S1009 illustrated in FIG. 10, when the SIP packet analyzing unit 203 judges that the received message is a 100 Trying response, the SIP packet analyzing unit 203 executes the processing of the operational flow chart illustrated in FIG. 12. Hereinafter, operations according to the operational flow chart illustrated in FIG. 12 will be described.

First, the SIP packet analyzing unit 203 judges a current transition state of a relevant SIP session (step S1201). The judgment is realized by referencing the value of the "session state" field in the aforementioned subject session management table.

As a result of the judgment performed in step S1201, when the SIP packet analyzing unit 203 judges that the current transition state is the "call setup" state (S902 in FIG. 9), the SIP packet analyzing unit 203 executes processing of step S1202. This is a state where, in the "call setup" state, a 100 Trying response is normally received in response to an INVITE request.

In this case, the SIP packet analyzing unit 203 executes only the processing for releasing the response timer (step S1202), terminates the processing of the operational flow chart illustrated in FIG. 12, and terminates the processing of step S1010 in FIG. 10. In this case, the "call setup" state (S902 in FIG. 9) is maintained without modification.

This operational sequence example corresponds to, for example, the respective S2 sequences illustrated in FIGS. 25 to 27 and to the respective S4 sequences illustrated in FIGS. 25 and 26.

As a result of the judgment performed in step S1201, when the SIP packet analyzing unit 203 judges that the current transition state is not the "call setup" state, the SIP packet analyzing unit 203 ignores and discards the 100 Trying response (step S1203).

Subsequently, the SIP packet analyzing unit 203 terminates the processing of the operational flow chart illustrated in FIG. 12 and terminates the processing of step S1010 in FIG. 10.

Figure 13:
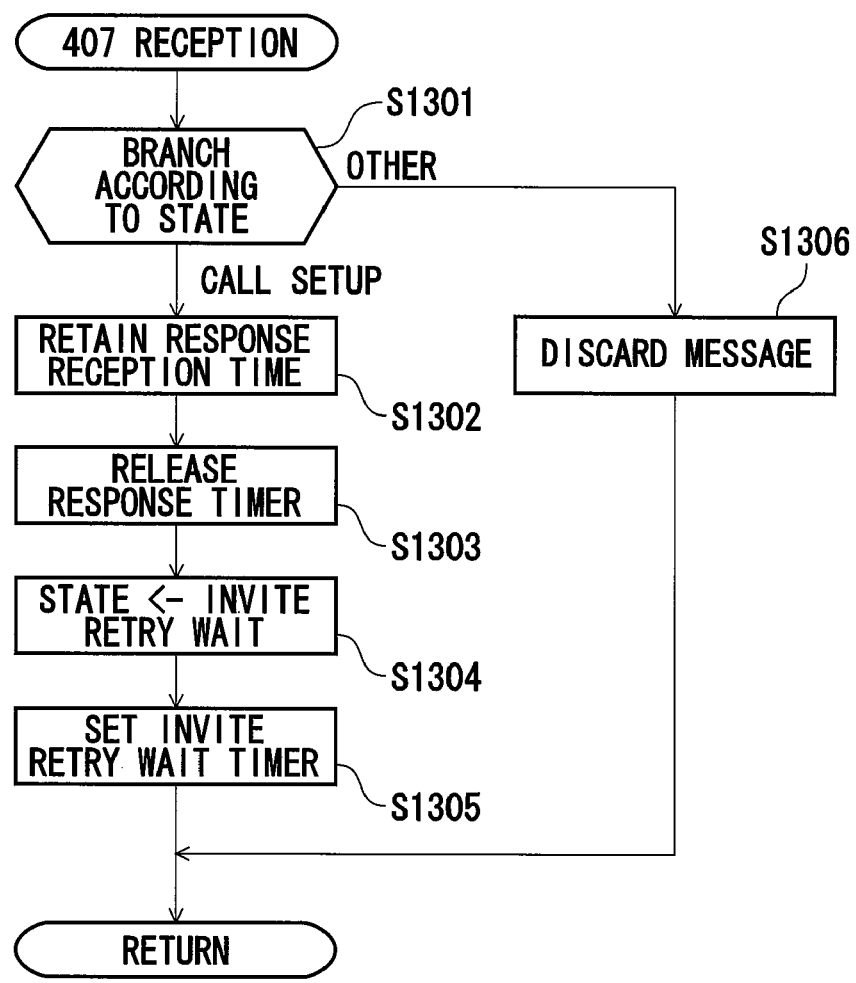
FIG. 13 is an operational flow chart illustrating control operations (reception processing of a 407 response) of the SIP packet analyzing unit 203.

Next, in step S1009 illustrated in FIG. 10, when the SIP packet analyzing unit 203 judges that the received message is the aforementioned 407 response, the SIP packet analyzing unit 203 executes the processing of the operational flow chart illustrated in FIG. 13. Hereinafter, operations according to the operational flow chart illustrated in FIG. 13 will be described.

First, the SIP packet analyzing unit 203 judges a current transition state of a relevant SIP session (step S1301). The judgment is realized by referencing the value of the "session state" field in the aforementioned subject session management table.

As a result of the judgment performed in step S1301, when the SIP packet analyzing unit 203 judges that the current transition state is the "call setup" state (S902 in FIG. 9), the SIP packet analyzing unit 203 executes processing of steps S1302 to S1305. In this case, as described earlier as reference character S2 in FIG. 24A, from the "call setup" state, a state transition is performed to transition to the "INVITE retry wait" state (S903 in FIG. 9) for further requesting an INVITE request in order to perform an authentication request from the SIP server side to a terminal or the like.

First, the SIP packet analyzing unit 203 retains the time at which the 407 response had been received in a "23456xx reception time" field (refer to FIG. 5) in the subject session management table (step S1302).

Next, the SIP packet analyzing unit 203 releases the response timer (step S1303).

The SIP packet analyzing unit 203 then retains "INVITE retry wait" in the "session state" field (refer to FIG. 5) in the subject session management table (step S1304). Accordingly, the transition state of the ingress or the egress of the SIP session represented by the subject session management table transitions from the "call setup" state (S902 in FIG. 9) to the "INVITE retry wait" state (S903 in FIG. 9).

Next, the SIP packet analyzing unit 203 sets an INVITE retry wait timer in correspondence to a path of the ingress or the egress of the SIP session corresponding to the subject session management table, and starts the INVITE retry wait timer (step S1305). This timer is for waiting for the reception of an INVITE request after receiving a 407 response regarding a path of the ingress or the egress of a relevant SIP session.

Subsequently, the SIP packet analyzing unit 203 terminates the processing of the operational flow chart illustrated in FIG. 13 and terminates the processing of step S1010 in FIG. 10.

As a result of the judgment performed in step S1301, when the SIP packet analyzing unit 203 judges that the current transition state is not the "call setup" state, the SIP packet analyzing unit 203 ignores and discards the 407 response (step S1306).

Subsequently, the SIP packet analyzing unit 203 terminates the processing of the operational flow chart illustrated in FIG. 13 and terminates the processing of step S1010 in FIG. 10.

Figure 14:
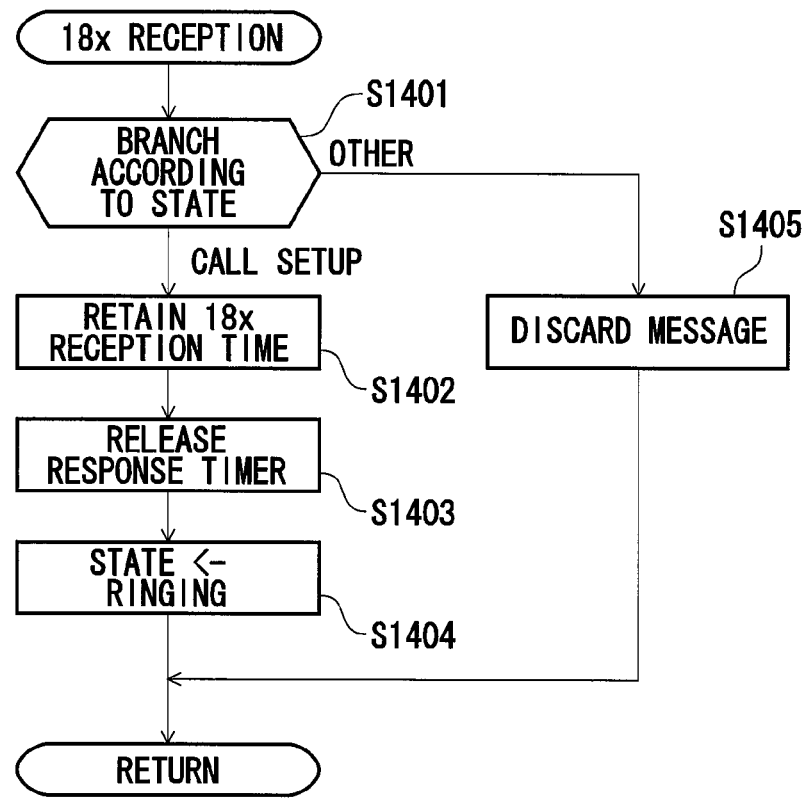
FIG. 14 is an operational flow chart illustrating control operations (reception processing of an 18x response) of the SIP packet analyzing unit 203.

Next, in step S1009 illustrated in FIG. 10, when the SIP packet analyzing unit 203 judges that the received message is the aforementioned 18x (where "x" is any single-digit numeral), the SIP packet analyzing unit 203 executes the processing of the operational flow chart illustrated in FIG. 14. Hereinafter, operations according to the operational flow chart illustrated in FIG. 14 will be described. This message is a message which displays that the current state is the call setup state.

First, the SIP packet analyzing unit 203 judges a current transition state of a relevant SIP session (step S1401). The judgment is realized by referencing the value of the "session state" field in the aforementioned subject session management table.

As a result of the judgment performed in step S1401, when the SIP packet analyzing unit 203 judges that the current transition state is the "call setup" state (S902 in FIG. 9), the SIP packet analyzing unit 203 executes processing of steps S1402 to S1404.

First, the SIP packet analyzing unit 203 retains the time at which an 18x response had been received in an "18x reception time" field (refer to FIG. 5) in the subject session management table (step S1402).

Next, the SIP packet analyzing unit 203 releases the response timer (step S1403).

The SIP packet analyzing unit 203 then retains "ringing" in the "session state" field (refer to FIG. 5) in the subject session management table (step S1404). Accordingly, the transition state of the ingress or the egress of the SIP session represented by the subject session management table transitions from the "call setup" state (S902 in FIG. 9) to the "ringing" state (S904 in FIG. 9).

Subsequently, the SIP packet analyzing unit 203 terminates the processing of the operational flow chart illustrated in FIG. 14 and terminates the processing of step S1010 in FIG. 10.

This operational sequence example made up of the series of processing of steps S1402 to S1404 described above corresponds to, for example, the S5 sequence (180 Ringing response) illustrated in FIG. 25.

As a result of the judgment performed in step S1401 described above, when the SIP packet analyzing unit 203 judges that the current transition state is not the "call setup" state, the SIP packet analyzing unit 203 ignores and discards the 18x response (step S1405).

Subsequently, the SIP packet analyzing unit 203 terminates the processing of the operational flow chart illustrated in FIG. 14 and terminates the processing of step S1010 in FIG. 10.

Figure 15:
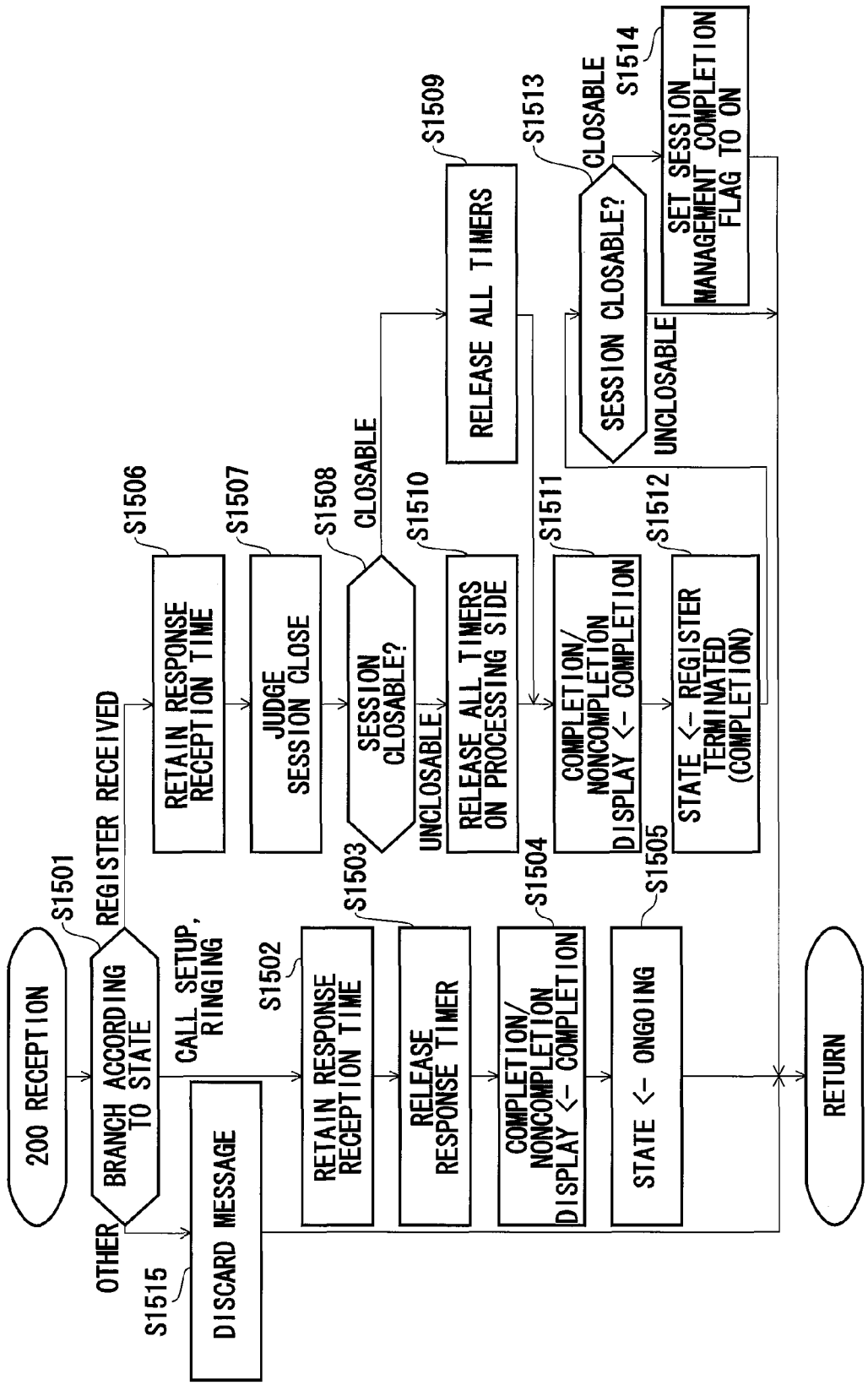
FIG. 15 is an operational flow chart illustrating control operations (reception processing of a 200 OK response) of the SIP packet analyzing unit 203.

Next, in step S1009 illustrated in FIG. 10, when the SIP packet analyzing unit 203 judges that the received message is the aforementioned 200 OK response, the SIP packet analyzing unit 203 executes the processing of the operational flow chart illustrated in FIG. 15. Hereinafter, operations according to the operational flow chart illustrated in FIG. 15 will be described. This message is a message which displays that the current state is the ringing state.

First, the SIP packet analyzing unit 203 judges a current transition state of a relevant SIP session (step S1501). The judgment is realized by referencing the value of the "session state" field in the aforementioned subject session management table.

As a result of the judgment performed in step S1501, when the SIP packet analyzing unit 203 judges that the current transition state is the "call setup" state (S902 in FIG. 9) or the "ringing" state (S904 in FIG. 9), the SIP packet analyzing unit 203 executes processing of steps S1502 to S1505.

First, the SIP packet analyzing unit 203 retains the time at which the 200 OK response had been received in the "23456xx reception time" field (refer to FIG. 5) in the subject session management table (step S1502).

Next, the SIP packet analyzing unit 203 releases the response timer (step S1503).

The SIP packet analyzing unit 203 then retains a value "1" indicating completion in a "completion/noncompletion" display field (refer to FIG. 5) in the subject session management table (step S1504). Accordingly, the session management state of the ingress or the egress of an SIP session represented by the subject session management table changes to a completion state, thereby enabling quality analysis by the SIP quality analyzing unit 204.

Next, the SIP packet analyzing unit 203 retains "ongoing" in the "session state" field (refer to FIG. 5) in the subject session management table (step S1505). Accordingly, the transition state of the ingress or the egress of the SIP session represented by the subject session management table transitions from the "call setup" state (S902 in FIG. 9) or the "ringing" state (S904 in FIG. 9) to the "ongoing" state (S905 in FIG. 9).

Subsequently, the SIP packet analyzing unit 203 terminates the processing of the operational flow chart illustrated in FIG. 15 and terminates the processing of step S1010 in FIG. 10.

This operational sequence example made up of the series of processing of steps S1502 to S1505 described above corresponds to, for example, the S7 and S8 sequences illustrated in FIG. 25.

As a result of the judgment performed in step S1501 described above, when the SIP packet analyzing unit 203 judges that the current transition state is a "REGISTER received" state (S908 in FIG. 9), the SIP packet analyzing unit 203 executes processing of steps S1506 to S1514.

Currently, an SIP server exists which retains a correspondence relationship between caller information or callee information and an IP address. When it is desired that a new correspondence relationship be registered in the SIP server, a REGISTER request is issued from a terminal or another SIP server to the relevant SIP server. An SIP server called a registrar performs a registration operation of the aforementioned correspondence relationship with respect to the REGISTER request, and upon completion thereof, returns a 200 OK response to the source of the REGISTER request and terminates processing. When the REGISTER request described above is issued, the transition state is changed to a "REGISTER received" state by the operational flow chart illustrated in FIG. 19 to be described later. Processing performed when a 200 OK response is returned in this state is the processing of steps S1506 to S1514 described below. In this case, processing for closing a corresponding session is to be executed.

First, the SIP packet analyzing unit 203 retains the time at which the 200 OK response had been received in the "23456xx reception time" field (refer to FIG. 5) in the subject session management table (step S1506).

Next, the SIP packet analyzing unit 203 judges whether or not both ingress and egress paths of an SIP session corresponding to the subject session management table or, in other words, the entire SIP session can be closed (step S1507). Selection thereof is set in advance by the network administrator. The SIP packet analyzing unit 203 makes the above judgment by referencing set contents thereof.

When the SIP packet analyzing unit 203 judges that the subject SIP session can be closed, the SIP packet analyzing unit 203 releases all timers (response timer, Audit timer, and REGISTER retry wait timer) corresponding to the subject SIP session (steps S1508 and S1509).

On the other hand, when the SIP packet analyzing unit 203 judges that the subject SIP session cannot be closed, the SIP packet analyzing unit 203 releases all timers (response timer, Audit timer, and REGISTER retry wait timer) corresponding only to whichever is the processing side among the ingress and the egress of the SIP session corresponding to the subject session management table (steps S1508 to S1510).

Next, the SIP packet analyzing unit 203 retains a value "1" indicating completion in the "completion/noncompletion" display field (refer to FIG. 5) in the subject session management table (step S1511). In addition, when the SIP packet analyzing unit 203 judges that the subject SIP session can be closed, the SIP packet analyzing unit 203 sets the session management completion flag in the subject session management table to "ON" (steps S1513 and S1514). Due to the above processing, the session management state of the entire SIP session represented by the subject session management table (when the entire SIP session can be closed) or the session management state of whichever is the processing side among the ingress and the egress of the SIP session (when the entire SIP session cannot be closed) changes to a completed state. Accordingly, a state is entered in which quality analysis by the SIP quality analyzing unit 204 can be performed. Accordingly, the transition state of the ingress or the egress of the SIP session represented by the subject session management table transitions from the "REGISTER received" state (S908 in FIG. 8) to a "REGISTER terminated" state (S909 in FIG. 9)(step S1512).

Subsequently, the SIP packet analyzing unit 203 terminates the processing of the operational flow chart illustrated in FIG. 15 and terminates the processing of step S1010 in FIG. 10.

As a result of the judgment performed in step S1501 described above, when the SIP packet analyzing unit 203 judges that the current transition state is neither the "call setup" state nor the "call ringing" state nor the "REGISTER received" state, the SIP packet analyzing unit 203 ignores and discards the 200 OK response (step S1515).

Subsequently, the SIP packet analyzing unit 203 terminates the processing of the operational flow chart illustrated in FIG. 15 and terminates the processing of step S1010 in FIG. 10.

Figure 16:
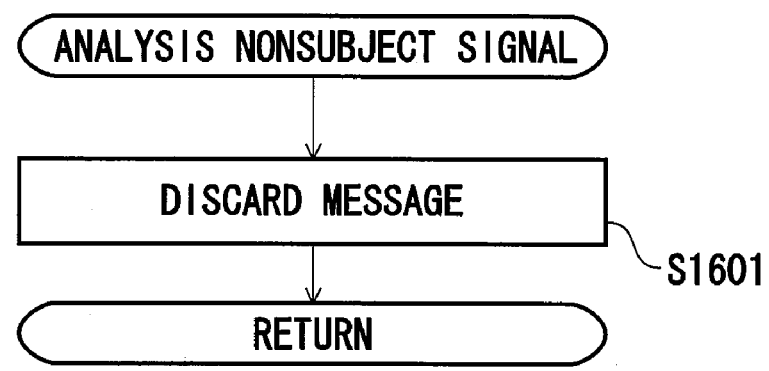
FIG. 16 is an operational flow chart illustrating control operations (reception processing of an analysis nonsubject signal) of the SIP packet analyzing unit 203.

Next, in step S1009 illustrated in FIG. 10, when the SIP packet analyzing unit 203 judges that the received message is an analysis nonsubject message, the SIP packet analyzing unit 203 executes the processing of the operational flow chart illustrated in FIG. 16.

In other words, the SIP packet analyzing unit 203 discards the received message (step S1601), terminates the processing of the operational flow chart illustrated in FIG. 16, and terminates the processing of step S1010 in FIG. 10.

Figure 17A:
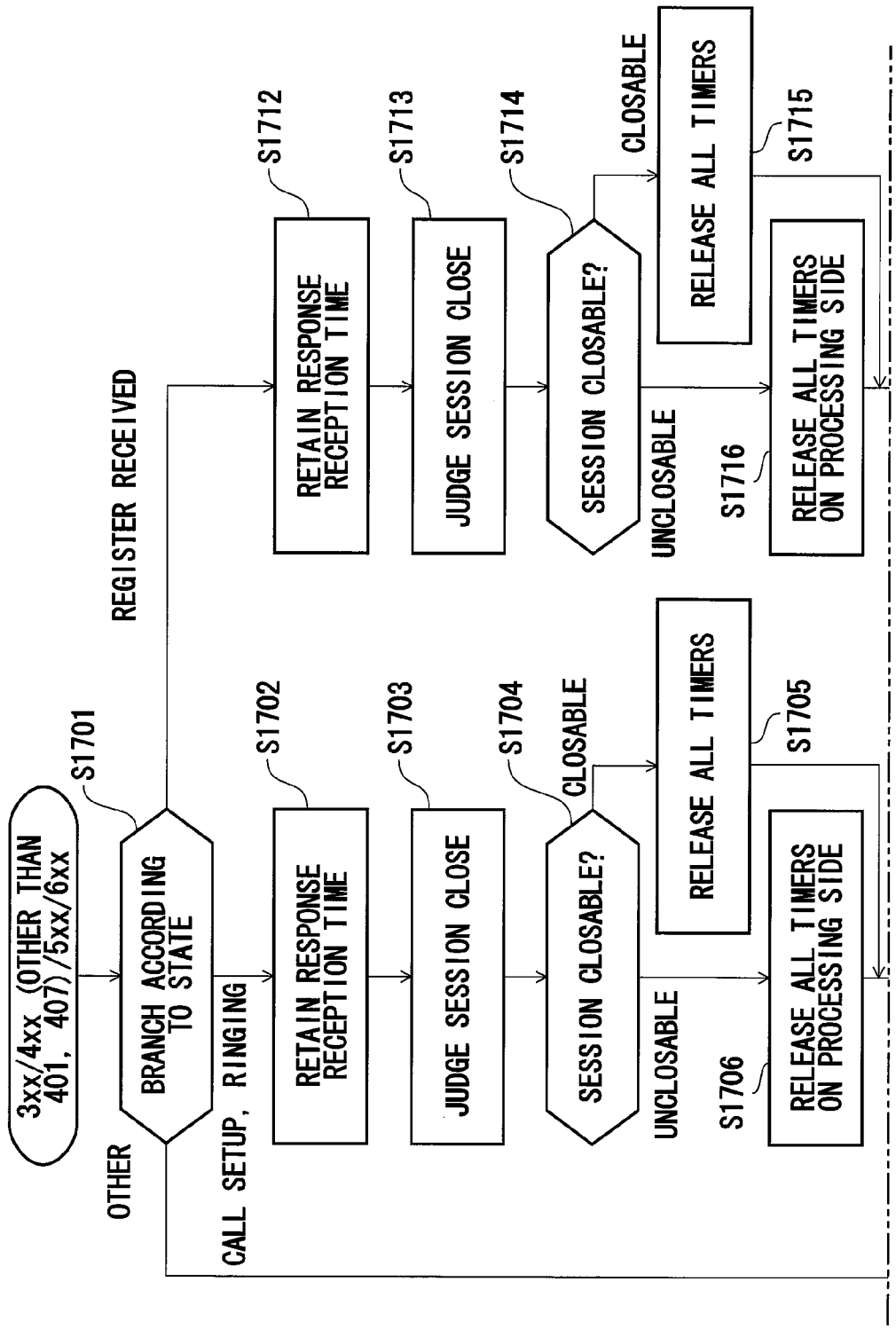
FIGS. 17A and 17B form an operational flow chart illustrating control operations (reception processing of 3xx/4xx (other than 401, 407)/5xx/6xx responses) of the SIP packet analyzing unit 203.
Figure 17B:
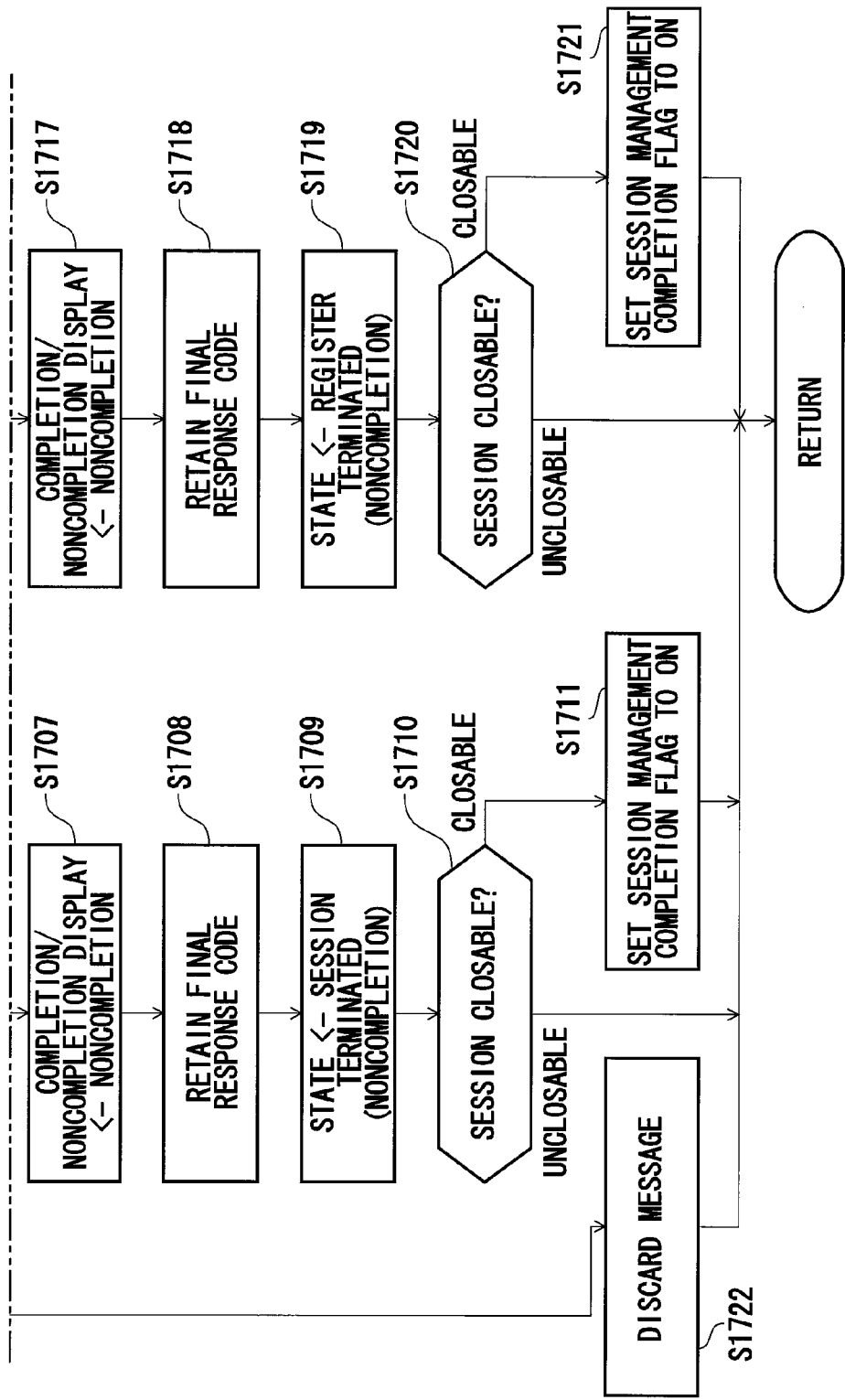

Next, in step S1009 illustrated in FIG. 10, when the SIP packet analyzing unit 203 judges that the received message is any of the aforementioned 3xx, 4xx (excluding 401 and 407), 5xx, and 6xx responses, the SIP packet analyzing unit 203 executes the processing of the operational flow chart illustrated in FIGS. 17A and 17B. Hereinafter, operations according to the operational flow chart illustrated in FIGS. 17A and 17B will be described. These responses are SIP responses for displaying some kind of error, and indicate a state where the session state should be changed to an incomplete state. Processing upon receiving a 407 response has already been provided in the description of the operational flow chart illustrated in FIG. 13. In addition, the processing upon receiving a 401 response will be provided later in the description of the operational flow chart illustrated in FIG. 18.

First, the SIP packet analyzing unit 203 judges a current transition state of a relevant SIP session (step S1701). The judgment is realized by referencing the value of the "session state" field in the aforementioned subject session management table.

As a result of the judgment performed in step S1701, when the SIP packet analyzing unit 203 judges that the current transition state is the "call setup" state (S902 in FIG. 9) or the ringing state (S904 in FIG. 9), the SIP packet analyzing unit 203 executes processing of steps S1702 to S1711.

First, the SIP packet analyzing unit 203 retains the time at which a response had been received in the "23456xx reception time" field (refer to FIG. 5) in the subject session management table (step S1702).

Next, the SIP packet analyzing unit 203 judges whether or not both ingress and egress paths of an SIP session corresponding to the subject session management table or, in other words, the entire SIP session can be closed (step S1703). This judgment is the same as the case of step S1507 illustrated in FIG. 15.

When the SIP packet analyzing unit 203 judges that the subject SIP session can be closed, the SIP packet analyzing unit 203 releases all timers (response timer, Audit timer, and INVITE retry wait timer) corresponding to the subject SIP session (steps S1704 and S1705).

On the other hand, when the SIP packet analyzing unit 203 judges that the subject SIP session cannot be closed, the SIP packet analyzing unit 203 releases all timers (response timer, Audit timer, and INVITE retry wait timer) corresponding only to whichever is the processing side among the ingress and the egress of the SIP session corresponding to the subject session management table (steps S1704 and S1706).

The SIP packet analyzing unit 203 then retains a value "0" indicating noncompletion in the "completion/noncompletion" display field (refer to FIG. 5) in the subject session management table (step S1707).

Next, the SIP packet analyzing unit 203 sets a code corresponding to the received response as a final response code and stores the same in a "final response code" field in the subject session management table (step S1708).

The SIP packet analyzing unit 203 then retains "session terminated" in the "session state" field (refer to FIG. 5) in the subject session management table (step S1709). Accordingly, the transition state of the ingress or the egress of the SIP session represented by the subject session management table transitions from the "call setup" state (S902 in FIG. 9) or the "ringing" state (S904 in FIG. 9) to the "session terminated" state (S907 in FIG. 9). In the session terminated state, since the content of the "completion/noncompletion" display field (refer to FIG. 5) in the subject session management table takes a value of "0" indicating noncompletion, the SIP quality analyzing unit 204 is able to recognize that the session had been terminated in an incomplete state.

In addition, based on step S1703, when the SIP packet analyzing unit 203 judges that the subject SIP session can be closed, the SIP packet analyzing unit 203 sets the session management completion flag in the subject session management table to "ON" (steps S1710 and S1711).

According to the above processing, the session management state of the entire SIP session represented by the subject session management table (when the entire SIP session can be closed) or the session management state of whichever is the processing side among the ingress and the egress of the SIP session (when the entire SIP session cannot be closed) is terminated. Accordingly, a state is entered in which quality analysis by the SIP quality analyzing unit 204 can be performed.

Subsequently, the SIP packet analyzing unit 203 terminates the processing of the operational flow chart illustrated in FIGS. 17A and 17B and terminates the processing of step S1010 in FIG. 10.

The operational sequence example made up of the series of processing of steps S1702 to S1711 described above corresponds to, for example, the respective S5 and S6 sequences illustrated in FIG. 26, and the S3 sequence illustrated in FIG. 27.

As a result of the judgment performed in step S1701 described above, when the SIP packet analyzing unit 203 judges that the current transition state is the "REGISTER received" state (S908 in FIG. 9), the SIP packet analyzing unit 203 executes processing of steps S1712 to S1721.

In this case, the series of processing of steps S1712 to S1718, S1720, and S1721 is similar to the series of processing of steps S1702 to S1708, S1710, and S1711 in the case where the current transition state is judged to be the "call setup" state (S902 in FIG. 9) or the "ringing" state (S904 in FIG. 9). However, in steps S1715 and S1716, a REGISTER retry wait timer is released instead of the INVITE retry wait timer.

In step S1719, the SIP packet analyzing unit 203 then retains "REGISTER terminated" in the "session state" field (refer to FIG. 5) in the subject session management table. Accordingly, the transition state of the ingress or the egress of the SIP session represented by the subject session management table transitions from the "REGISTER received" state (S908 in FIG. 8) to the "REGISTER terminated" state (S911 in FIG. 9). In the REGISTER terminated state, since the content of the "completion/noncompletion" display field (refer to FIG. 5) in the subject session management table takes a value of "0" indicating noncompletion, the SIP quality analyzing unit 204 is able to recognize that a REGISTER reception had been terminated in an incomplete state.

After the processing of step S1720 or S1721, the SIP packet analyzing unit 203 terminates the processing of the operational flow chart illustrated in FIGS. 17A and 17B and terminates the processing of step S1010 in FIG. 10.

As a result of the judgment performed in step S1701 described above, when the SIP packet analyzing unit 203 judges that the current transition state is neither the "call setup" state nor the "call ringing" state nor the "REGISTER received" state, the SIP packet analyzing unit 203 ignores and discards the received SIP response (step S1722).

Subsequently, the SIP packet analyzing unit 203 terminates the processing of the operational flow chart illustrated in FIGS. 17A and 17B and terminates the processing of step S1010 in FIG. 10.

Figure 18:
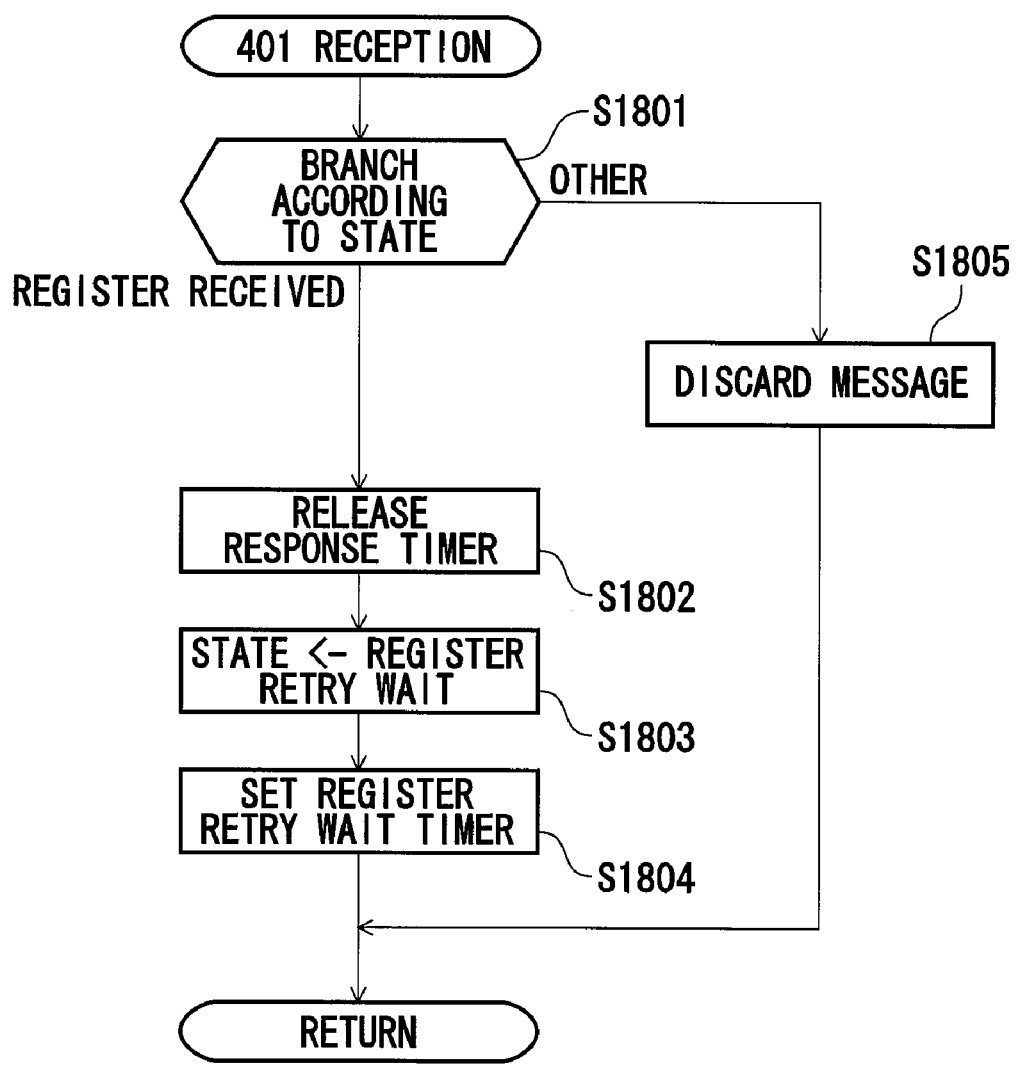
FIG. 18 is an operational flow chart illustrating control operations (reception processing of a 401 response) of the SIP packet analyzing unit 203.

Next, in step S1009 illustrated in FIG. 10, when the SIP packet analyzing unit 203 judges that the received message is the aforementioned 401 response, the SIP packet analyzing unit 203 executes the processing of the operational flow chart illustrated in FIG. 18. Hereinafter, operations according to the operational flow chart illustrated in FIG. 18 will be described. This processing is for performing a state transition from the "REGISTER received" state (S908 in FIG. 9) to a "REGISTER retry wait" state (S910 in FIG. 9).

Figure 24B:
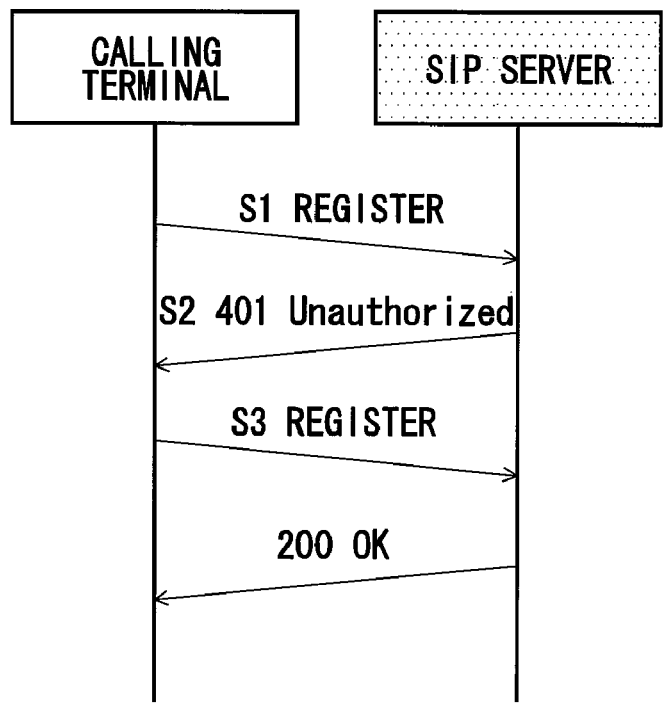

The "REGISTER retry wait" state is exemplified as, for example, the operational sequence diagram illustrated in FIG. 24B. This is the same state as the "INVITE retry wait" state (S903 in FIG. 9) described earlier with reference to FIG. 24A. In other words, for example, there is a case where an authentication request is made from the side of an SIP server to a terminal or the like after the SIP server receives a REGISTER request (S1) from the terminal or the like. In this case, a special response called "401 Unauthorized" is returned from the SIP server to the terminal or the like (S2). In response thereto, a REGISTER request is once again sent from the terminal to the SIP server (S3). The processing performed upon receiving the aforementioned 401 response is the processing described below.

First, the SIP packet analyzing unit 203 judges a current transition state of a relevant SIP session (step S1801). The judgment is realized by referencing the value of the "session state" field in the aforementioned subject session management table.

As a result of the judgment performed in step S1801, when the SIP packet analyzing unit 203 judges that the current transition state is the "REGISTER received" state (S908 in FIG. 9), the SIP packet analyzing unit 203 executes processing of steps S1802 to S1804.

First, the SIP packet analyzing unit 203 releases the response timer (step S1802).

Next, the SIP packet analyzing unit 203 retains "REGISTER retry wait" in the "session state" field (refer to FIG. 5) in the subject session management table (step S1803). Accordingly, the transition state of the ingress or the egress of the SIP session represented by the subject session management table transitions from the "REGISTER received" state (S908 in FIG. 9 to the "REGISTER retry wait" state (S910 in FIG. 9).

Next, the SIP packet analyzing unit 203 sets a REGISTER retry wait timer in correspondence to a path of the ingress or the egress of the SIP session corresponding to the subject session management table, and starts the REGISTER retry wait timer (step S1804). This timer is for waiting for the reception of a REGISTER request after receiving a 401 response regarding a path of the ingress or the egress of a relevant SIP session.

Subsequently, the SIP packet analyzing unit 203 terminates the processing of the operational flow chart illustrated in FIG. 18 and terminates the processing of step S1010 in FIG. 10.

As a result of the judgment performed in step S1801, when the SIP packet analyzing unit 203 judges that the current transition state is not the "REGISTER received" state, the SIP packet analyzing unit 203 ignores and discards the 401 response (step S1805).

Subsequently, the SIP packet analyzing unit 203 terminates the processing of the operational flow chart illustrated in FIG. 18 and terminates the processing of step S1010 in FIG. 10.

Figure 19:
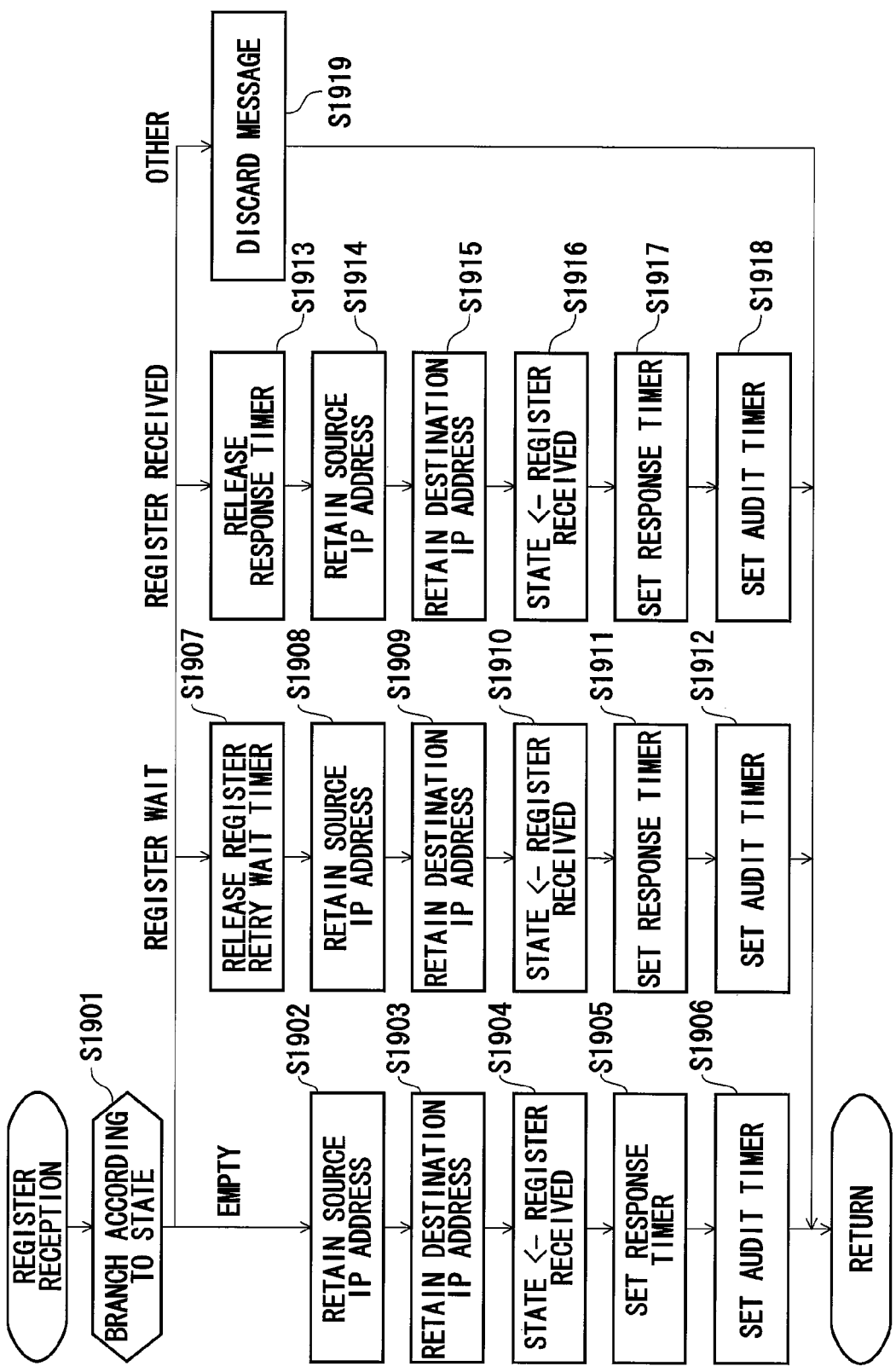
FIG. 19 is an operational flow chart illustrating control operations (reception processing of a REGISTER request) of the SIP packet analyzing unit 203.

In step S1009 illustrated in FIG. 10, when the SIP packet analyzing unit 203 judges that the received message is a REGISTER request, the SIP packet analyzing unit 203 executes the processing of the operational flow chart illustrated in FIG. 19. Hereinafter, operations according to the operational flow chart illustrated in FIG. 19 will be described.

First, the SIP packet analyzing unit 203 judges a current transition state of a relevant SIP session (step S1901). The judgment is realized by referencing the value of the "session state" field in the aforementioned subject session management table.

As a result of the judgment performed in step S1901, when the SIP packet analyzing unit 203 judges that the current transition state is an "empty" state (S901 in FIG. 9), the SIP packet analyzing unit 203 executes processing of steps S1902 to S1906.

In other words, the SIP packet analyzing unit 203 first retains a source IP address in the header of the IP packet in which the REGISTER request had been stored in the "source IP address" field (refer to FIG. 5) in the subject session management table (step S1902).

Next, the SIP packet analyzing unit 203 retains a destination IP address in the header of the IP packet in which the REGISTER request had been stored in the "destination IP address" field (refer to FIG. 5) in the subject session management table (step S1903).

The SIP packet analyzing unit 203 then retains "REGISTER received" in the "session state" field (refer to FIG. 5) in the subject session management table (step S1904). Accordingly, the transition state of the ingress or the egress of the SIP session represented by the subject session management table transitions from the "empty" state (S901 in FIG. 9) to the "REGISTER received" state (S908 in FIG. 9).

Next, the SIP packet analyzing unit 203 sets a response timer in correspondence to a path of the ingress or the egress of the SIP session corresponding to the subject session management table, and starts the response timer (step S1905). When a response to the REGISTER request is not returned, the expiration of the timer causes the SIP session (ingress or egress) to be determined incomplete and enables resources such as the session management table, various timers, and the like to be released.

The SIP packet analyzing unit 203 then sets an Audit timer in correspondence to a path of the ingress or the egress of the SIP session corresponding to the subject session management table, and starts the Audit timer (step S1906).

Subsequently, the SIP packet analyzing unit 203 terminates the processing of the operational flow chart illustrated in FIG. 19 and terminates the processing of step S1010 in FIG. 10.

As a result of the judgment performed in step S1901 described above, when the SIP packet analyzing unit 203 judges that the current transition state is a "REGISTER retry wait" state (S910 in FIG. 9), the SIP packet analyzing unit 203 executes processing of steps S1907 to S1912.

The "REGISTER retry wait" state has already been described in reference to, for example, the operational sequence diagram illustrated in FIG. 24B. When a REGISTER request is further received in this state (S3 in FIG. 24B), the SIP packet analyzing unit 203 once again returns the transition state from the "REGISTER retry wait" state to the "REGISTER received" state (S908 in FIG. 9). This is realized by the series of processing of steps S1907 to 1912 illustrated in FIG. 19.

First, the SIP packet analyzing unit 203 releases a REGISTER retry wait timer set in regards to a path of the ingress or the egress of an SIP session corresponding to the subject session management table (step S1907). The timer has been set and started in step S1804 illustrated in FIG. 18 upon the reception of the aforementioned 401 response. Due to the release of the timer, in the "REGISTER retry wait" state, the time count for waiting for the next REGISTER request is terminated.

Next, as a series of processing of steps S1908 to S1912, the SIP packet analyzing unit 203 retains a source IP address and a destination IP address in the subject session management table, sets the "register received" state, and sets and starts a response timer and an audit timer. The processing is the same as the series of processing of steps S1902 to S1906 described earlier.

Subsequently, the SIP packet analyzing unit 203 terminates the processing of the operational flow chart illustrated in FIG. 19 and terminates the processing of step S1010 in FIG. 10.

As a result of the judgment performed in step S1901 described above, when the SIP packet analyzing unit 203 judges that the current transition state is the "REGISTER received" state (S908 in FIG. 9), the SIP packet analyzing unit 203 executes processing of steps S1913 to S1918. This is a case where, for example, after the "REGISTER received" state is set upon the reception of a REGISTER request, a REGISTER request is repeatedly received.

In this case, the SIP packet analyzing unit 203 temporarily releases the response timer (step S1913) and, as a series of processing of steps S1914 to S1918, once again retains a source IP address and a destination IP address in the subject session management table, sets the "register received" state, and sets and starts a response timer and an audit timer. The processing is the same as the series of processing of steps S1902 to S1906 described earlier.

Subsequently, the SIP packet analyzing unit 203 terminates the processing of the operational flow chart illustrated in FIG. 19 and terminates the processing of step S1010 in FIG. 10.

As a result of the judgment of step S1901 described above, when the SIP packet analyzing unit 203 judges that the current transition state is neither the "empty" state nor the "REGISTER retry wait" state nor the "REGISTER received" state, the SIP packet analyzing unit 203 ignores and discards the REGISTER request (step S1919).

Subsequently, the SIP packet analyzing unit 203 terminates the processing of the operational flow chart illustrated in FIG. 19 and terminates the processing of step S1010 in FIG. 10.

According to the series of operations described above, the processing of step S1010 illustrated in FIG. 10 is specifically executed. After the processing of step S1010, the SIP packet analyzing unit 203 returns to the processing of step S1001 and analyzes the contents of the next received packet.

The SIP packet analyzing unit 203 executes timer monitoring independently of the SIP packet analysis processing illustrated in FIG. 10. In doing so, the SIP packet analyzing unit 203 respectively monitors whether or not the measurement periods of response timers, Audit timers, INVITE retry wait timers, and REGISTER retry wait timers set for each of the ingress and egress of all session management tables have expired. The SIP packet analyzing unit 203 then executes the processing of the operational flow charts illustrated in FIGS. 20 to 22 on expired timers.

Figure 20:
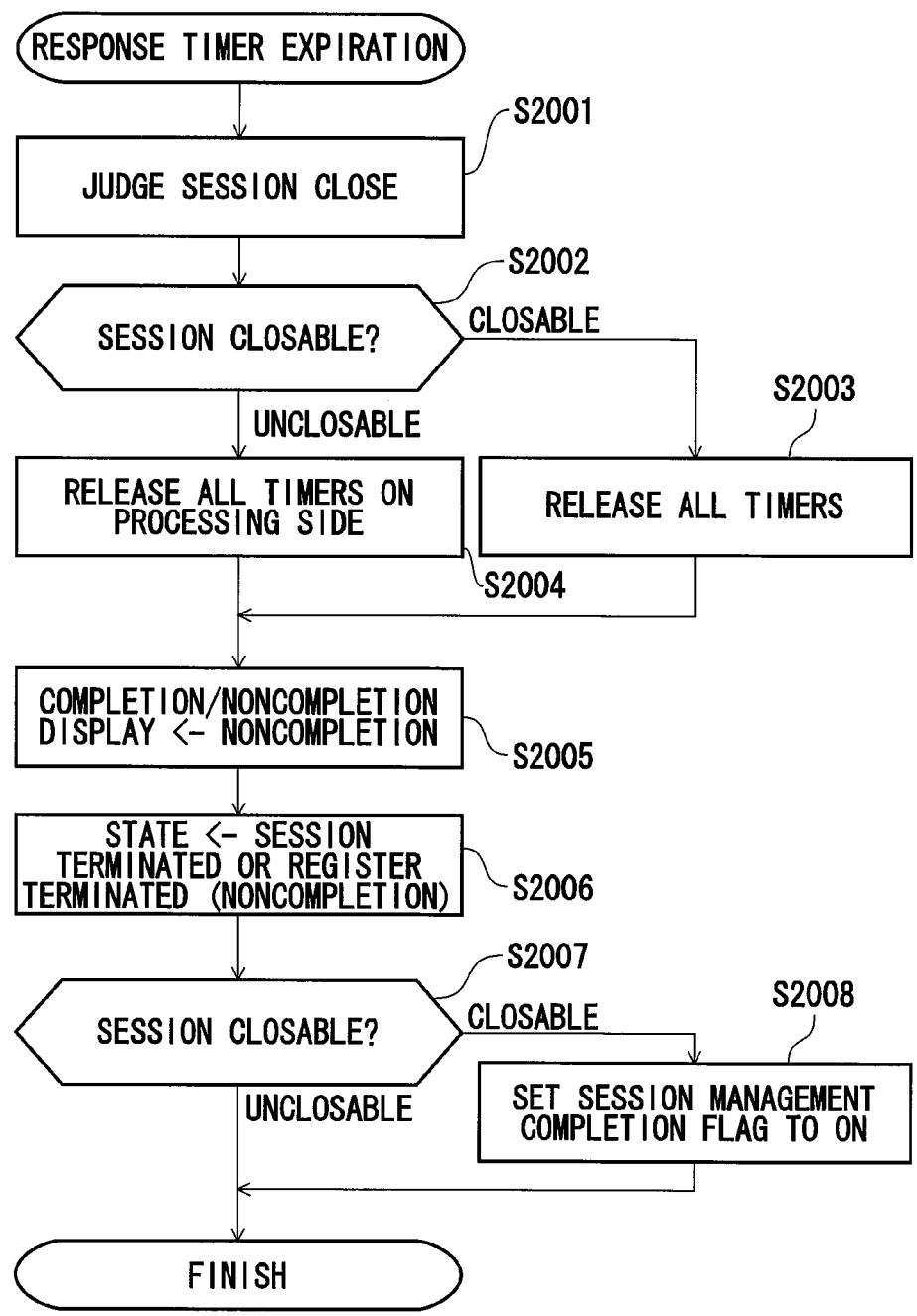
FIG. 20 is an operational flow chart illustrating control operations (response timer expiration processing) of the SIP packet analyzing unit 203.

FIG. 20 is an operational flow chart illustrating operations upon expiration of a response timer.

First, the SIP packet analyzing unit 203 judges whether or not both ingress and egress paths of an SIP session corresponding to the subject session management table or, in other words, whether or not the entire SIP session can be closed (step S2001). This judgment is the same as the case of step S1507 illustrated in FIG. 15.

When the SIP packet analyzing unit 203 judges that the subject SIP session can be closed, the SIP packet analyzing unit 203 releases all timers (response timer, Audit timer, and INVITE retry wait timer) corresponding to the subject SIP session (steps S2002 and S2003).

On the other hand, when the SIP packet analyzing unit 203 judges that the subject SIP session cannot be closed, the SIP packet analyzing unit 203 releases all timers (response timer, Audit timer, and INVITE retry wait timer) corresponding only to whichever is the processing side among the ingress and the egress of the SIP session corresponding to the subject session management table (steps S2002 and S2004).

Next, the SIP packet analyzing unit 203 then retains a value "0" indicating noncompletion in the "completion/noncompletion" display field (refer to FIG. 5) in the subject session management table (step S2005).

The SIP packet analyzing unit 203 then retains "session terminated" or "REGISTER terminated" in the "session state" field (refer to FIG. 5) in the subject session management table (step S2006). Accordingly, the transition state of the ingress or the egress of the SIP session represented by the subject session management table transitions to the "session terminated" state (S907 in FIG. 9) or the "REGISTER terminated" state (S911 in FIG. 9). In this state, since the content of the "completion/noncompletion" display field (refer to FIG. 5) in the subject session management table takes a value of "0" indicating noncompletion, the SIP quality analyzing unit 204 is able to recognize that the session or REGISTER had been terminated in an incomplete state.

In addition, based on step S2001, when the SIP packet analyzing unit 203 judges that the subject SIP session can be closed, the SIP packet analyzing unit 203 sets the session management completion flag in the subject session management table to "ON" (steps S2007 and S2008).

Subsequently, the SIP packet analyzing unit 203 terminates the processing of the operational flow chart illustrated in FIG. 20.

Figure 21:
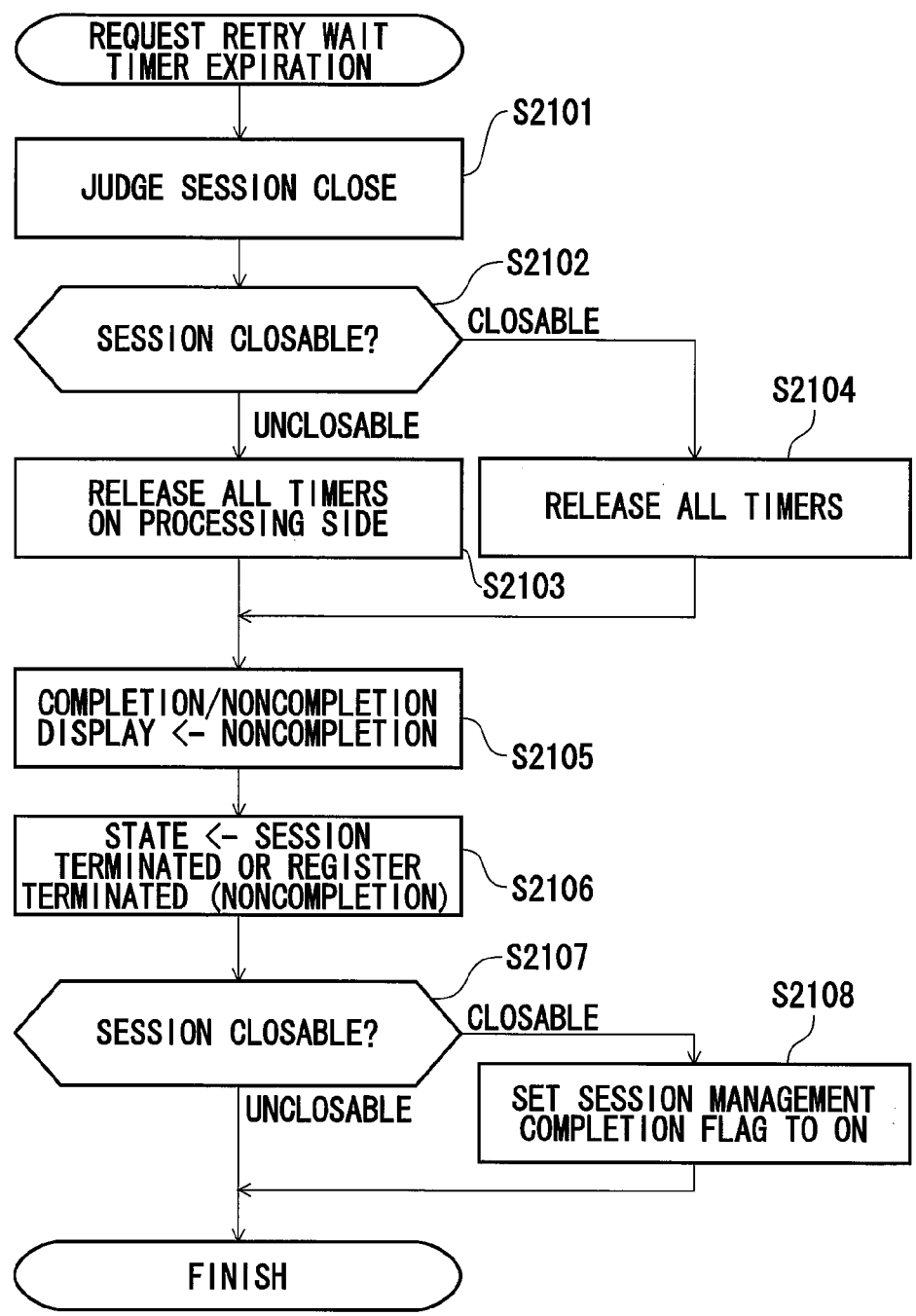
FIG. 21 is an operational flow chart illustrating control operations (request retry wait timer expiration processing) of the SIP packet analyzing unit 203.

FIG. 21 is an operational flow chart illustrating operations upon the expiration of an INVITE retry wait timer or a REGISTER retry wait timer. The series of processing of steps S2101 to S2108 illustrated in FIG. 21 are the same as the series of processing of steps S2001 to S2008 illustrated in FIG. 20 and which is executed upon expiration of a response timer. Accordingly, a session in which these timers had expired closes in an incomplete state.

Figure 22:
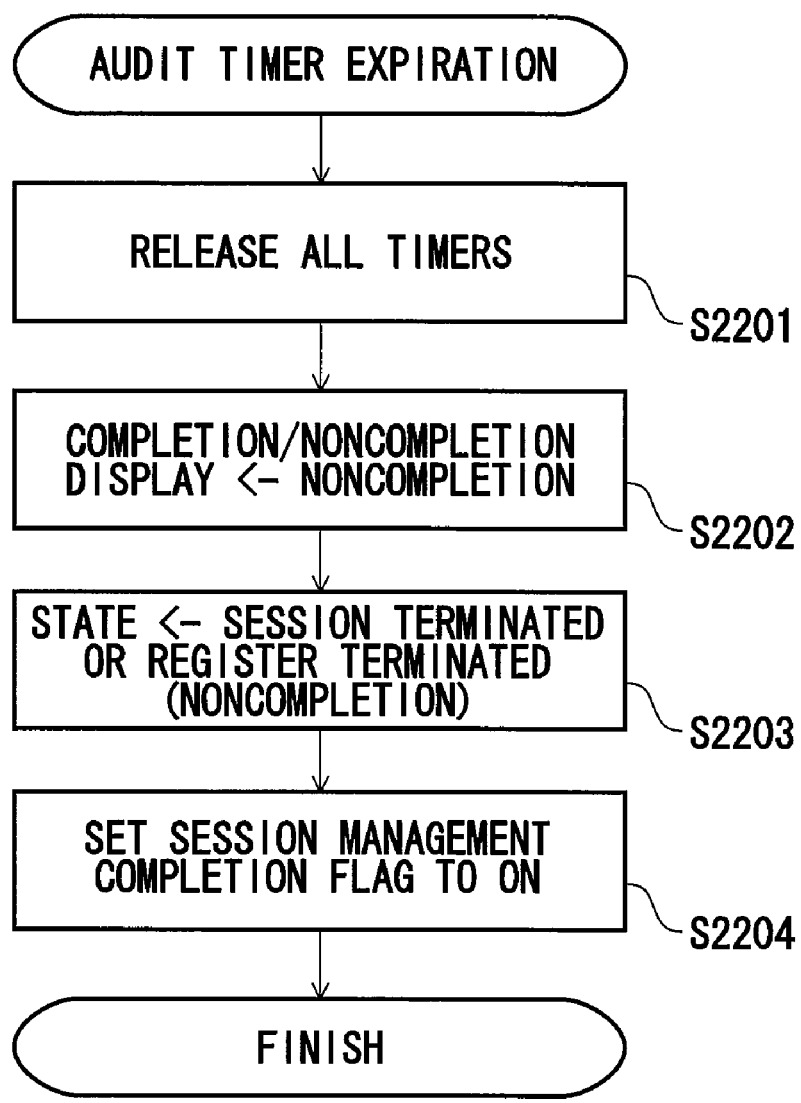
FIG. 22 is an operational flow chart illustrating control operations (Audit timer expiration processing) of the SIP packet analyzing unit 203.

FIG. 22 is an operational flow chart illustrating operations upon expiration of an Audit timer.

First, the SIP packet analyzing unit 203 unconditionally releases all timers (response timer, Audit timer, and INVITE retry timer) corresponding to a subject SIP session (step S2201).

Next, the SIP packet analyzing unit 203 then retains a value "0" indicating noncompletion in the "completion/noncompletion" display field (refer to FIG. 5) in the subject session management table (step S2202).

The SIP packet analyzing unit 203 then retains "session terminated" or "REGISTER terminated" in the "session state" field (refer to FIG. 5) in the subject session management table (step S2203). Accordingly, the transition state of the ingress or the egress of the SIP session represented by the subject session management table transitions to the "session terminated" state (S907 in FIG. 9) or the "REGISTER terminated" state (S911 in FIG. 9). In this state, since the content of the "completion/noncompletion" display field (refer to FIG. 5) in the subject session management table takes a value of "0" indicating noncompletion, the SIP quality analyzing unit 204 is able to recognize that the session or REGISTER had been terminated in an incomplete state.

Finally, the SIP packet analyzing unit 203 sets the session management completion flag in the subject session management table to "ON" (step S2204).

Subsequently, the SIP packet analyzing unit 203 terminates the processing of the operational flow chart illustrated in FIG. 22.

Among the state transitions illustrated in FIG. 9, when a BYE message is received as an SIP message in the "ongoing" state (S905 in FIG. 9), a transition is made to the "session terminated" state (S906 in FIG. 9). However, in the present embodiment once the "ongoing" state is entered, subsequent transitions are no longer monitored, thereby enabling the SIP quality analyzing unit 204 illustrated in FIG. 2 to analyze session quality. Accordingly, prompt SIP quality analysis is realized.

In addition, among the state transitions illustrated in FIG. 9, when a 407 response or a 401 response is received in the "call setup" state (S902 in FIG. 9) or the "REGISTER received" state (S908 in FIG. 9), control is performed so that a transition is made to the "INVITE retry wait" state (S903 in FIG. 9) or the "REGISTER retry wait" state (S910 in FIG. 9) as described earlier with reference to FIGS. 13 and 18. However, such cases may be handled as incomplete sessions as a network policy to be set by the network administrator. In this case, when a 407 response or a 401 response is received, control is performed so that the operational flow chart illustrated in FIGS. 17A and 17B is executed. Such options may be arranged so as to be selectable by the network administrator.

Figure 28A:
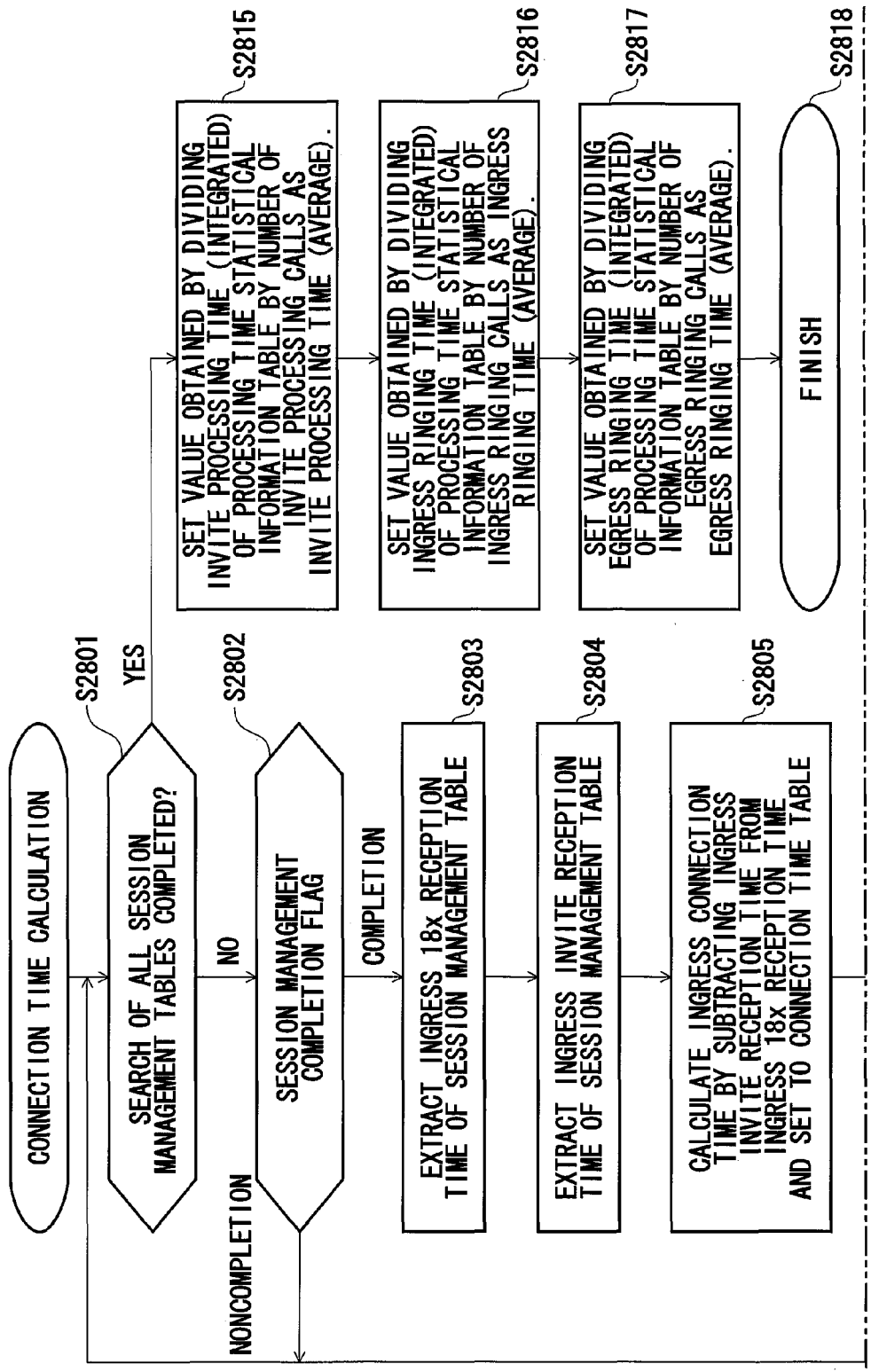
FIGS. 28A and 28B form an operational flow chart illustrating connection time calculation processing by an SIP quality analyzing unit 204.
Figure 28B:
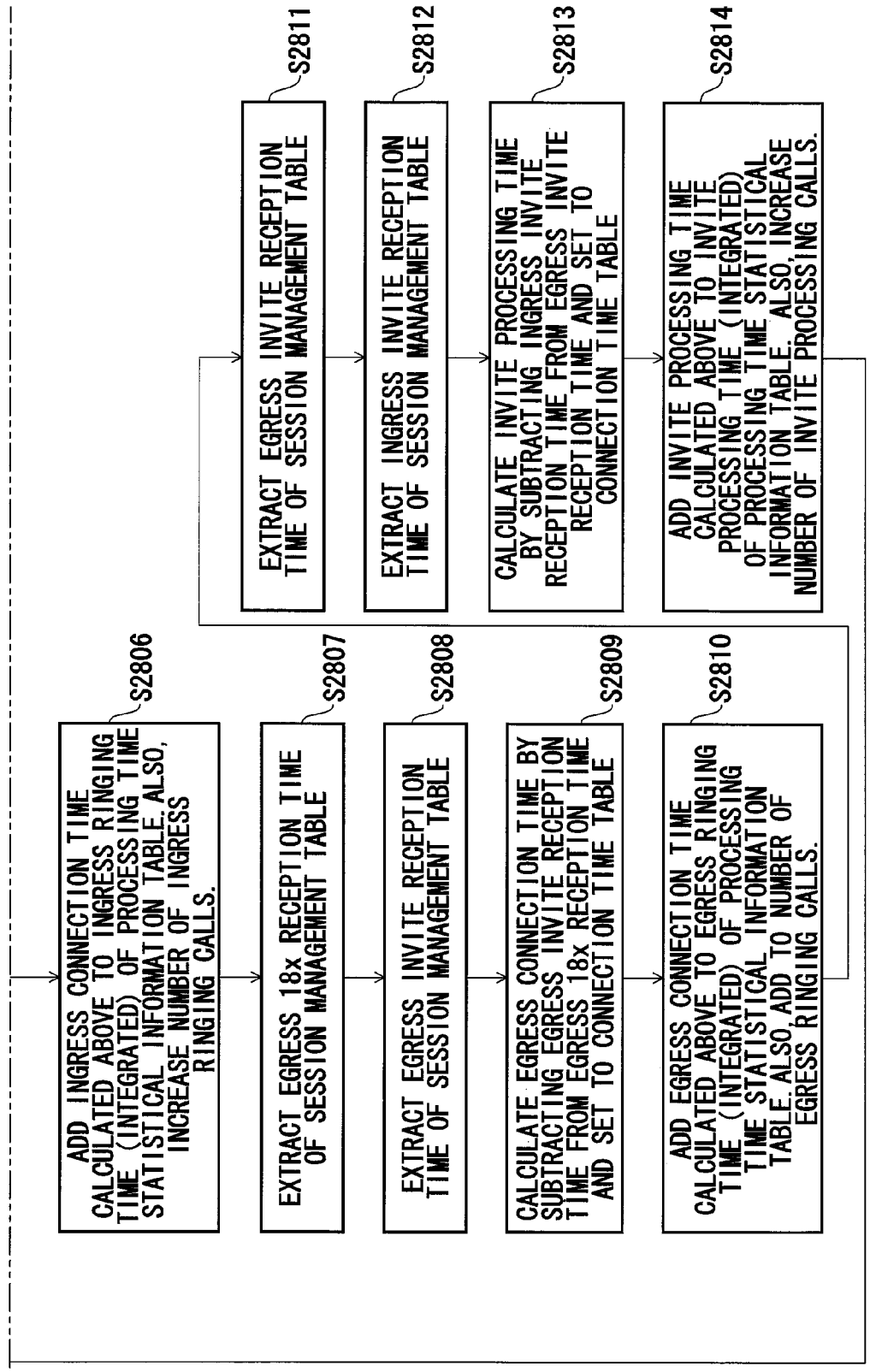

FIGS. 28A and 28B form an operational flow chart illustrating connection time calculation processing by the SIP quality analyzing unit 204 illustrated in FIG. 2.

First, the series of processing of steps S2802 to S2814 is executed until it is judged in step S2801 that searches for all session management tables stored in the session management table storing unit 205 have been completed.

The SIP quality analyzing unit 204 first judges, for searched session management tables, whether or not the session management completion flag is indicating a completed state or, in other words, whether or not "ON" has been set (step S2802).

The processing of the following steps S2803 to S2814 is executed only on session management tables whose session management completion flags are set to "ON".

First, the SIP quality analyzing unit 204 extracts an 18x reception time in the ingress information region of the session management table (step S2803). An 18x response indicates a ringing state. Next, the SIP quality analyzing unit 204 extracts an INVITE reception time in the ingress information region of the session management table (step S2804). The SIP quality analyzing unit 204 then calculates an ingress connection time by subtracting the INVITE reception time in the ingress information region from the 18x reception time in the ingress information region, and sets the calculated ingress connection time to a connection time table retained in the SIP quality analyzing unit 204 (step S2805). FIG. 29A is a diagram illustrating an example of a connection time table.

Next, the SIP quality analyzing unit 204 adds the ingress connection time calculated in the above processing to an ingress ringing time (integrated) of the processing time statistical information table retained in the SIP quality analyzing unit 204. In addition, the SIP quality analyzing unit 204 adds the number of ingress ringing calls (heretofore step S2806). FIG. 29B is a diagram illustrating an example of a processing time statistical information table.

Next, the SIP quality analyzing unit 204 extracts an 18x reception time of an egress information region of the session management table (step S2807). The SIP quality analyzing unit 204 then extracts an INVITE reception time in the egress information region of the session management table (step S2808). The SIP quality analyzing unit 204 then calculates an egress connection time by subtracting the INVITE reception time in the egress information region from the 18x reception time in the egress information region, and sets the calculated egress connection time to the connection time table (refer to FIG. 29A) retained in the SIP quality analyzing unit 204 (step S2809).

Next, the SIP quality analyzing unit 204 adds the egress connection time calculated in the above processing to an egress ringing time (integrated) of the processing time statistical information table (refer to FIG. 29B) retained in the SIP quality analyzing unit 204. In addition, the SIP quality analyzing unit 204 adds the number of egress ringing calls (heretofore step S2810).

Next, the SIP quality analyzing unit 204 extracts an INVITE reception time in the egress information region of the session management table (step S2811). The SIP quality analyzing unit 204 then extracts an INVITE reception time in the ingress information region of the session management table (step S2812). Next, the SIP quality analyzing unit 204 subtracts the INVITE reception time in the ingress information region from the INVITE reception time in the egress information region to calculate an INVITE processing time, and sets the same in the connection time table (refer to FIG. 29A) (step S2813).

The SIP quality analyzing unit 204 then adds the INVITE processing time calculated in the above processing to the INVITE processing time (integrated) in the processing time statistical information table (refer to FIG. 29B). In addition, the SIP quality analyzing unit 204 adds the number of processed INVITE calls (heretofore step S2814).

The judgment of step S2801 results in YES after the processing of steps S2802 to S2814 described above is performed on all searched session management tables.

As a result, the SIP quality analyzing unit 204 sets a value obtained by dividing the INVITE processing time (integrated) by the number of processed INVITE calls of the processing time statistical information table (refer to FIG. 29B) as an INVITE processing time (average) (step S2815).

Next, the SIP quality analyzing unit 204 sets a value obtained by dividing the ingress ringing time (integrated) by the number of ingress ringing calls of the processing time statistical information table (refer to FIG. 29B) as an ingress ringing time (average) (step S2816).

Finally, the SIP quality analyzing unit 204 sets a value obtained by dividing the egress ringing time (integrated) by the number of egress ringing calls of the processing time statistical information table (refer to FIG. 29B) as an egress ringing time (average) (step S2817).

Figure 30:
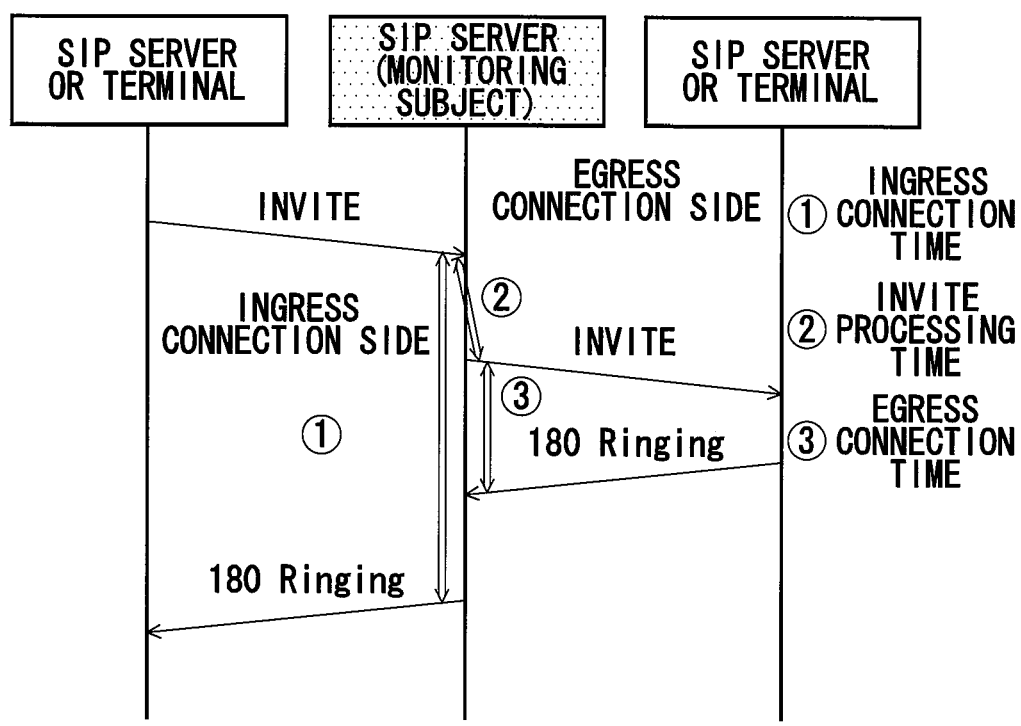
FIG. 30 is an operational illustrative diagram of connection time calculation processing.

The relationship between the ingress connection time, the INVITE processing time, and the egress connection time collected by the above processing is illustrated in FIG. 30.

Figure 31A:
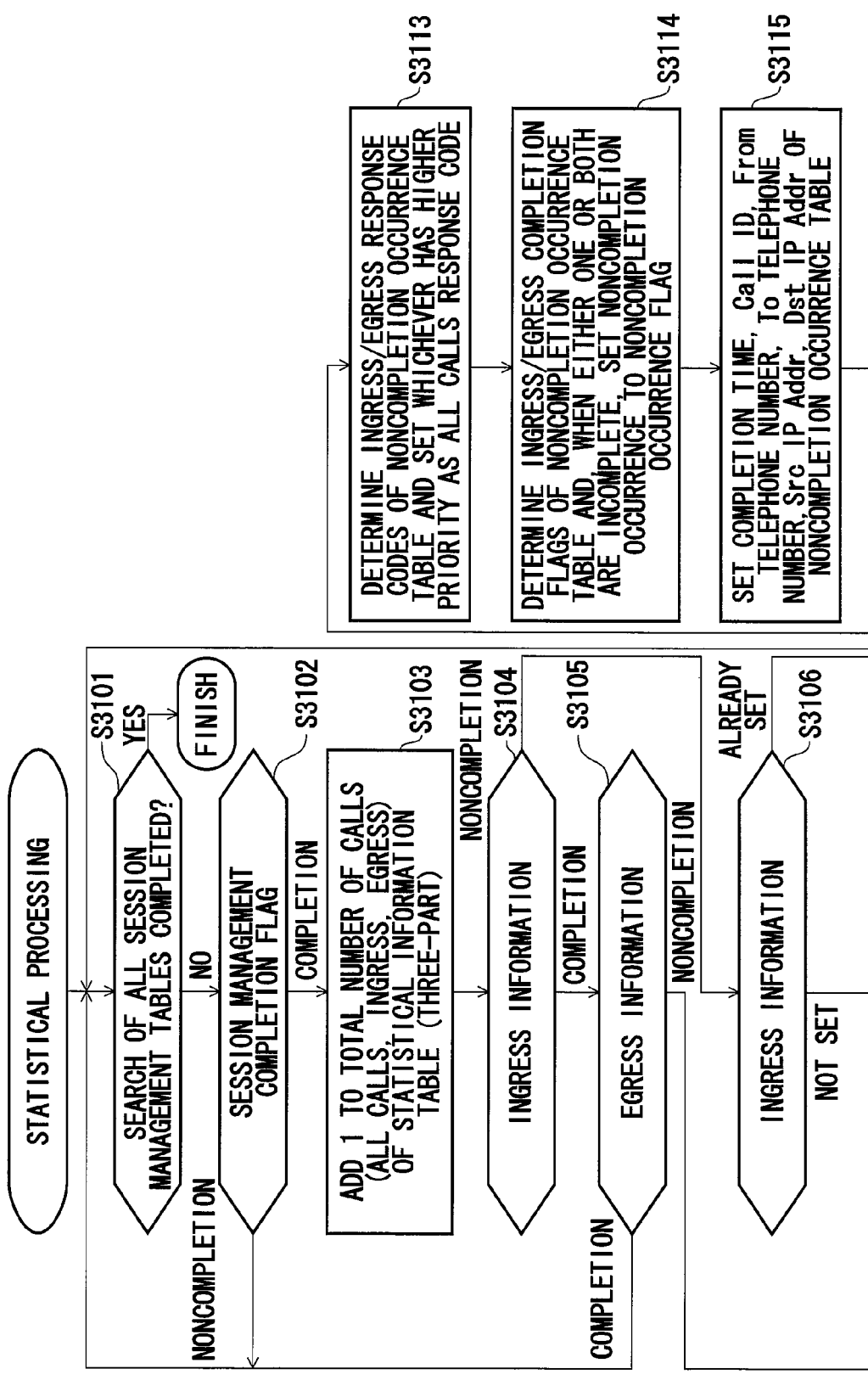
FIGS. 31A and 31B form an operational flow chart illustrating statistical processing by the SIP quality analyzing unit 204.
Figure 31B:
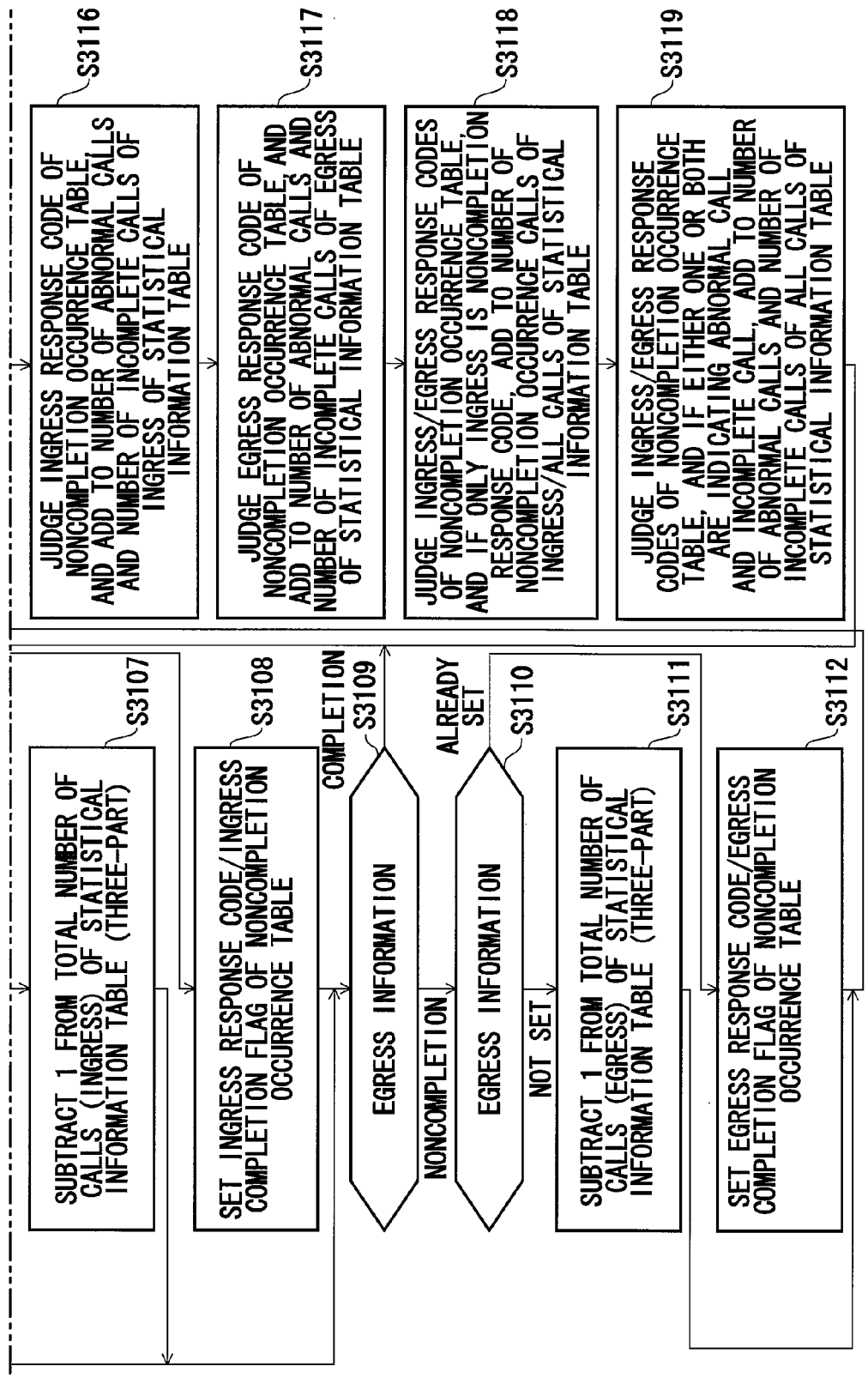

FIGS. 31A and 31B form an operational flow chart illustrating statistical processing to be executed by the SIP quality analyzing unit 204 illustrated in FIG. 2.

First, the series of processing of steps S3102 to S3119 is executed until it is judged in step S3101 that searches for all session management tables stored in the session management table storing unit 205 have been completed.

The SIP quality analyzing unit 204 first judges, for searched session management tables, whether or not the session management completion flag is indicating a completed state or, in other words, whether or not "ON" has been set (step S3102).

The processing of the following steps S3103 to S3119 is executed only on session management tables whose session management completions flags are set to "ON".

First, the SIP quality analyzing unit 204 respectively adds 1 to the total number of calls (all calls, ingress, egress) of the statistical information table (three-part) retained therein (step S3103). FIG. 32A is a diagram illustrating a configuration example of the statistical information table (three-part).

Next, the SIP quality analyzing unit 204 judges which of "completion" and "noncompletion" is registered as a completion/noncompletion display in the ingress information region (step S3104).

When the SIP quality analyzing unit 204 judges that "completion" is displayed in the ingress information region, the SIP quality analyzing unit 204 further judges which of "completion" and "noncompletion" is registered as a completion/noncompletion display in the egress information region (step S3105).

When the SIP quality analyzing unit 204 judges that "completion" is also displayed in the egress information region, the SIP quality analyzing unit 204 returns to search processing of the next session management table in step S3101.

When the SIP quality analyzing unit 204 judges in step S3104 that "noncompletion" is displayed in the ingress information region, the SIP quality analyzing unit 204 judges whether or not an ingress response code has already been set for the ingress information region in a noncompletion occurrence table (step S3106). FIG. 32B is a diagram illustrating a configuration example of a noncompletion occurrence table.

When an ingress response code has not been set for the ingress information region in the noncompletion occurrence table, since SIP information has not been set for the ingress, the SIP quality analyzing unit 204 subtracts 1 from the total number of calls (ingress) of the statistical information table (three-part) which is just the amount extraneously added in step S3103 (step S3107).

When an ingress response code has already been set for the ingress information region in the noncompletion occurrence table, the SIP quality analyzing unit 204 sets an ingress response code/ingress completion flag of the noncompletion occurrence table (step S3108).

Next, the SIP quality analyzing unit 204 judges which of "completion" and "noncompletion" is registered as a completion/noncompletion display in the egress information region (step S3109).

When the SIP quality analyzing unit 204 judges in step S3109 that "noncompletion" is displayed in the egress information region, the SIP quality analyzing unit 204 judges whether or not an egress response code has already been set for the egress information region in the noncompletion occurrence table (step S3110).

When an egress response code has not been set for the egress information region in the noncompletion occurrence table, since SIP information has not been set for the egress, the SIP quality analyzing unit 204 subtracts 1 from the total number of calls (egress) of the statistical information table (three-part) which is just the amount extraneously added in step S3103 (step S3111).

When an egress response code has already been set for the egress information region in the noncompletion occurrence table, the SIP quality analyzing unit 204 sets an egress response code/egress completion flag of the noncompletion occurrence table (step S3112).

When the SIP quality analyzing unit 204 judges after the processing of step S3112 above or in step S3109 described earlier that "completion" is displayed in the egress information region, the SIP quality analyzing unit 204 determines the ingress/egress response codes in the noncompletion occurrence table, and sets whichever has the higher priority as the all calls response code (step S1113).

Next, the SIP quality analyzing unit 204 determines the ingress/egress completion flags in the noncompletion occurrence table, and when either one or both are incomplete, sets the noncompletion occurrence flag to "noncompletion occurrence" (step S3114).

The SIP quality analyzing unit 204 then sets a completion time, a Call-ID, caller information (From), callee information (To), a source IP address, and a destination IP address of the noncompletion occurrence table (step S3115).

Next, the SIP quality analyzing unit 204 judges the ingress response code of the noncompletion occurrence table, and adds to the number of abnormal calls and the number of incomplete calls of the ingress of the statistical information table (step S3116).

The SIP quality analyzing unit 204 then judges the egress response code of the noncompletion occurrence table, and adds to the number of abnormal calls and the number of incomplete calls of the egress of the statistical information table (step S3117).

Next, the SIP quality analyzing unit 204 judges the ingress/egress response codes of the noncompletion occurrence table, and when only the ingress is an incomplete response code, adds to the number of incompletion occurrence calls of the ingress/all calls of the statistical information table (step S3118).

The SIP quality analyzing unit 204 then judges the ingress/egress response codes of the noncompletion occurrence table, and when either one or both of the ingress/egress response codes is indicating an abnormal call and an incomplete call, adds to the number of abnormal calls and the number of incomplete calls of all calls of the statistical information table (step S3119).

After the above processing, the SIP quality analyzing unit 204 returns to the processing of step S3101 in order to search the next session management table.

In step S3101, when searches of all session management tables have been completed, the SIP quality analyzing unit 204 terminates the statistical processing illustrated in FIGS. 31A and 31B.

As described above, the SIP quality analyzing unit 204 references a session management table in which an SIP session state and session information have been retained by the SIP packet analyzing unit 203, and analyzes the information. Accordingly, it is now possible for the SIP quality analyzing unit 204 to identify a completion or noncompletion (quasi-normal, abnormal) of a session, identify a connection time up to the moment a caller becomes aware of a session ringing state (180 Ringing reception), identify the time required by an SIP server to process a call connection signal, and the like.

Subsequently, the SIP quality analyzing unit 204 is now able to analyze all of a plurality of sessions to become analysis subjects, and aggregate the analysis results as statistical information. In addition, by defining, in advance, a threshold of statistical data to be determined a quality deterioration, the SIP quality analyzing unit 204 can now also determine notifying the network administrator of a quality deterioration by way of an alarm when the threshold is exceeded.

Furthermore, the statistical information notifying unit 206 can now provide statistical information collected by the SIP quality analyzing unit 204 to the network administrator and can also notify an alarm to the network administrator.

According to the technique described above, instead of collecting statistical information by a signaling protocol server, signaling protocol quality information can now be collected by a network-side network quality monitoring device.

In addition, even during a period where the signaling protocol server is suspended due to a failure, quality information such as the state of traffic to the signaling protocol server can be collected including before and after the suspension.

Furthermore, the signaling protocol server is not subjected to any processing load when collecting quality information, a network quality state can be grasped without affecting the processing capabilities of the signaling protocol server.

Moreover, it is now possible to collect, from the network side, the same traffic amount as the traffic amount of a signaling protocol session processed by the signaling protocol server that is a monitoring subject, and network operation management can be performed in an appropriate manner.

In addition, a network administrator can now grasp, with respect to a monitoring subject server, a control quality state of an SIP session at an ingress thereof, a control quality state of an SIP session at an egress thereof, and a total SIP session quality state combining the ingress and the egress.

Furthermore, upon a noncompletion, a network administrator can now easily grasp whether the monitoring subject server is a noncompletion-detected server or the monitoring subject server had simply been notified of a noncompletion that is actually being detected at a back-end server or on a network.

Moreover, it is now possible to grasp statistical information per ingress, per egress, and as a total number, and to promptly identify a failed server or a failed segment. As a result, failure factors can be promptly solved.

Furthermore, since completion/noncompletion determination is performed by distinguishing between an SIP final response that becomes necessary before an SIP session is established and a final response that should be considered incomplete, it is possible to enhance the accuracy of SIP session control quality measurement and to perform network operation management in an appropriate manner.

Moreover, when monitoring a gateway server to another protocol or the like, it is now possible to uniquely understand that a delay in a connection time measured at an ingress is attributable to some factor existing in another back-end protocol network including the network administrator's own server, and that a delay in a connection time measured at an egress is attributable to a delay factor in the SIP network. Therefore, the cause of a delay can be promptly identified.

In addition, since the SIP signal processing capabilities of a monitoring subject SIP server can be recognized, it is now possible to grasp the congestion state of the SIP server.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention.

The invention claimed is:

1. A network quality monitoring device operated on an IP network in which communication is performed based on an Internet protocol and monitoring network quality in an Internet service whose communication state is controlled based on a signaling protocol, the network quality monitoring device comprising:
   a packet receiving unit that receives packets used by a signaling protocol server device, which is a server device for processing the signaling protocol and which receives a request from a client to communicate with the IP network;
   a signaling protocol packet extracting unit that extracts signaling protocol packets for controlling the signaling protocol from packets received by the packet receiving unit;
   a signaling protocol packet analyzing unit that analyzes the signaling protocol packets for establishing a communication session, which are extracted by the signaling protocol packet extracting unit and which are transmitted and received by the signaling protocol server device respectively at an ingress and an egress, in order to associate signaling protocol information obtained from the signaling protocol packets and session states for each session and for each of the ingress and the egress, and manage the associated signaling protocol information and the session states as session management tables while managing transitions of the session states;
   a session management table storing unit that stores the session management tables;
   a signaling protocol quality analyzing unit that collects quality information regarding the network quality from session management tables corresponding to sessions that have transitioned to a predetermined communication state among the session management tables stored in the session management table storing unit and, based on the collection result, analyzes statistical information regarding the network quality; and
   a statistical information notifying unit that notifies the quality information and the statistical information obtained at the signaling protocol quality analyzing unit.

2. The network quality monitoring device according to claim 1, wherein
   sessions that have transitioned to the predetermined communication state include sessions that have transitioned to an ongoing state of the communication after call setup for the communication had been initiated, as well as sessions that have transitioned to an incomplete termination state without reaching the ongoing state of the communication after call setup for the communication had been initiated.

3. The network quality monitoring device according to claim 2, wherein
   the signaling protocol packet analyzing unit
   defines, in advance, a signaling protocol packet that causes the sessions to transition to the incomplete termination state as a network policy, and
   when a signaling protocol packet consistent with the definition is extracted, causes the communication state of the sessions to transition to the incomplete termination state.

4. The network quality monitoring device according to claim 1, wherein
   the signaling protocol quality analyzing unit collects the quality information and analyzes the statistical information in units of respective ingress and egress and in units of the sessions that combine the ingress and the egress.

5. The network quality monitoring device according to claim 1, wherein
   the signaling protocol packet analyzing unit collects reception times of the signaling protocol information and manages the reception times in the session management tables, and
   the signaling protocol quality analyzing unit collects information regarding the reception times of the signaling protocol information from the session management tables and analyzes the statistical information regarding the connection times of the network based on the collection result.

6. The network quality monitoring device according to claim 1, wherein
   the signaling protocol packet analyzing unit collects reception times of the signaling protocol information and manages the reception times in a session management table, and
   the signaling protocol quality analyzing unit collects information regarding the reception times of the signaling protocol information respectively corresponding to the ingress and the egress from the session management table and calculates information regarding a time difference between the ingress and the egress in order to analyze statistical information regarding the processing time of the signaling protocol server device.

7. A network quality monitoring method operated on an IP network in which communication is performed based on an Internet protocol for monitoring network quality in an Internet service whose communication state is controlled based on a signaling protocol, the network quality monitoring method comprising:
   a packet receiving step for receiving packets used by a signaling protocol server device, which is a server device for processing the signaling protocol and which receives a request from a client to communicate with the IP network;
   a signaling protocol packet extracting step for extracting signaling protocol packets for controlling the signaling protocol from packets received in the packet receiving step;

a signaling protocol packet analyzing step for analyzing the signaling protocol packets for establishing a communication session, which are extracted in the signaling protocol packet extracting step and which are transmitted and received by the signaling protocol server device respectively at an ingress and an egress, in order to associate signaling protocol information obtained from the signaling protocol packets and the session states for each session and for each of the ingress and the egress, and manage the associated signaling protocol information and the session states as session management tables while managing transitions of the session states;

a signaling protocol quality analyzing step for collecting quality information regarding the network quality from session management tables corresponding to sessions that have transitioned to a predetermined communication state among the session management tables and, based on the collection result, analyzing statistical information regarding the network quality; and a statistical information notifying step for notifying the quality information and the statistical information obtained in the signaling protocol quality analyzing step.

8. The network quality monitoring method according to claim 7, wherein sessions that have transitioned to the predetermined communication state include sessions that have transitioned to an ongoing state of the communication after call setup for the communication had been initiated, as well as sessions that have transitioned to an incomplete termination state without reaching the ongoing state of the communication after call setup for the communication had been initiated.

9. The network quality monitoring method according to claim 8, wherein in the signaling protocol packet analyzing step, a signaling protocol packet that causes the sessions to transition to the incomplete termination state as a network policy is defined in advance, and when a signaling protocol packet consistent with the definition is extracted, the communication state of the sessions is caused to transition to the incomplete termination state.

10. The network quality monitoring method according to claim 7, wherein in the signaling protocol quality analyzing step, the quality information is collected and the statistical information is analyzed in units of respective ingress and egress and in units of the sessions that combine the ingress and the egress.

11. The network quality monitoring method according to claim 7, wherein in the signaling protocol packet analyzing step, reception times of the signaling protocol information are collected and managed in the session management tables, and in the signaling protocol quality analyzing step, information regarding the reception times of the signaling protocol information is collected from the session management tables and the statistical information regarding the connection times of the network is analyzed based on the collection result.

12. The network quality monitoring method according to claim 7, wherein in the signaling protocol packet analyzing step, reception times of the signaling protocol information are collected and managed in the session management table, and in the signaling protocol quality analyzing step, information regarding the reception times of the signaling protocol information respectively corresponding to the ingress and the egress is collected from the session management table and information regarding a time difference between the ingress and the egress is calculated in order to analyze statistical information regarding the processing time of the signaling protocol server device.

* * * * *